US 9,450,836 B2

(12) United States Patent
Hammer et al.

(10) Patent No.: US 9,450,836 B2
(45) Date of Patent: Sep. 20, 2016

(54) SYSTEM AND METHOD FOR MANAGEMENT OF NETWORK-BASED SERVICES

(71) Applicants: Michael P. Hammer, Reston, VA (US); Ashish Dalela, Bangalore (IN); Monique J. Morrow, Zurich (CH); Peter C. Tomsu, Leitzersdorf (AT)

(72) Inventors: Michael P. Hammer, Reston, VA (US); Ashish Dalela, Bangalore (IN); Monique J. Morrow, Zurich (CH); Peter C. Tomsu, Leitzersdorf (AT)

(73) Assignee: Cisco Technology, Inc., San Jose, CA (US)

( * ) Notice: Subject to any disclaimer, the term of this patent is extended or adjusted under 35 U.S.C. 154(b) by 485 days.

(21) Appl. No.: 13/725,567

(22) Filed: Dec. 21, 2012

(65) Prior Publication Data
US 2013/0166703 A1    Jun. 27, 2013

Related U.S. Application Data

(60) Provisional application No. 61/580,564, filed on Dec. 27, 2011.

(51) Int. Cl.
*H04L 12/24* (2006.01)
*H04L 29/06* (2006.01)
*H04M 15/00* (2006.01)

(52) U.S. Cl.
CPC ........... *H04L 41/50* (2013.01); *H04L 41/5054* (2013.01); *H04L 63/10* (2013.01); *H04M 15/44* (2013.01); *H04M 15/49* (2013.01)

(58) Field of Classification Search
CPC ..................... H04N 21/6405; H04N 21/6408; H04N 21/812; H04L 67/00; H04L 67/327; H04L 67/16; H04L 63/10; H04M 15/49; H04M 15/44; G06F 21/44; H04W 48/16; H04W 48/18
See application file for complete search history.

(56) References Cited

U.S. PATENT DOCUMENTS

| | | | | |
|---|---|---|---|---|
| 2009/0034533 | A1* | 2/2009 | Chellappa et al. | 370/395.21 |
| 2011/0158088 | A1* | 6/2011 | Lofstrand | G06F 9/465 370/229 |
| 2011/0314082 | A1* | 12/2011 | Koneti | 709/203 |
| 2011/0320527 | A1* | 12/2011 | Turakhia | 709/203 |

(Continued)

FOREIGN PATENT DOCUMENTS

| | | | | |
|---|---|---|---|---|
| WO | WO 2008/110955 A2 | 9/2008 | | H04L 29/06 |
| WO | WO 2008/110955 A3 | 9/2008 | | H04L 12/56 |

OTHER PUBLICATIONS

IEEE "Service Discovery based on Multicast DNS in IPv6 Mobile Ad-hoc Networks" Authors: Jaehoon Jeong, Jungsoo Park, Hyoungjun Kim 0-7803.7757-5103/$17.00 © 2003 IEEE pp. 1763-1764.*

(Continued)

*Primary Examiner* — Chirag R Patel
*Assistant Examiner* — Rachel J Hackenberg
(74) *Attorney, Agent, or Firm* — Baker Botts L.L.P.

(57) ABSTRACT

In one embodiment, a system includes an interface configured to receive a first request sent from a first customer for a first service provided by a first service provider, the first request being of a first type. The system also includes at least one processor configured to determine a first set of configuration parameters from a first policy associated with the first service provider in response to receiving the first request. The at least one processor also causes a node associated with the first service provider to provide the first service in response to receiving the first request using the first set of configuration parameters.

21 Claims, 10 Drawing Sheets

(56) References Cited

U.S. PATENT DOCUMENTS

2012/0147885 A1* 6/2012 Johri et al. ............. 370/390
2013/0218618 A1* 8/2013 Purcell ............... G06F 9/5072
                                                                                                                                                                705/7.13

OTHER PUBLICATIONS

Rosenberg, J., et al., "*SIP: Session Initiation Protocol*", Network Working Group, Request for Comments: 3261, Category: Standards Track, http://www.ietf.org/rfc/rfc3261.txt, Jun. 2002.

DMTF® Distributed Management Task Force, Inc., CIM Overview Document, "*The Value of the Common Information Model (Why CIM?)*", http://www.dmtf.org/sites/default/files/Why%20CIM%20Overview%20Document_2010.pdf, Jun. 2003.

IEEE Standard for Local and metropolitan area networks--, "*Virtual Bridged Local Area Networks*", Std 802.1Q-2005, 2006.

DMTF® Distributed Management Task Force, Inc., CMDB Federation, "*DMTF Standards for Federating CMDBs and other Management Data Repositories*", http://www.dmtf.org/sites/default/files/DMTF_Standards_for_Federating_CMDBs_20090910v2.pdf, Sep. 10, 2009.

DMTF® Distributed Management Task Force, Inc., "*Open Virtualization Format Specification*", Document No. DSP0243, Version 1.1.0, http://www.dmtf.org/sites/default/files/standards/documents/DSP0243_1.1.0.pdf, Jan. 12, 2010.

Cisco Overlay Transport Virtualization Technology Introduction and Deployment Considerations, "*Chapter 1: OTV Technology Introduction and Deployment Considerations*" http://www.cisco.com/cn/US/docs/solutions/Enterprise/Data_Center/DCI/whitepaper/DCI_1.html, Jan. 17, 2012.

Cisco Nexus 7000 Series NX-OS LISP Configuration Guide, OL-25808-03, "*LISP VM-Mobility*", http://www.cisco.com/cn/US/docs/switches/datacenter/sw/nx-os/lisp/configuration/guide/b_NX-OS_LISP_Configuration_Guide_chapter_010.html, Aug. 10, 2012.

DMTF® Distributed Management Task Force, Inc., "Open Virtualization Format Specification" Document No. DSP0243, Version: 2.0.0, http://www.dmtf.org/sites/default/files/standards/documents/DSP0243_2.0.0.pdf, Dec. 13, 2012.

Ahmed, Reaz, et al., "*Resource And Service Discovery In Large-Scale Multi-Domain Networks*", IEEE Communication Surveys, The Electronic Magazine of Original Peer-Reviewed Survey Articles, www.comsoc.org/pubs/surveys, 4th Quarter 2007, vol. 9, No. 4, 29 pages, Oct. 1, 2007.

Hammer, M., Cisco Systems, "*Service Orchestration Protocol*", draft-dalela-sop-00.txt, Internet Draft, Intended Status: Standards Track, pp. 1-38, Jan. 4, 2012.

Hammer, M., Cisco Systems, "*SOP Message Flows*", draft-dalela-sop-flows-00.txt, Internet Draft, Intended Status: Standards Track, pp. 1-29, Jan. 4, 2012.

European Patent Office, PCT, Notification of Transmittal of The International Search Report and The Written Opinion of the International Searching Authority, or the Declaration, International Application No. PCT/US2012/071420, 14 pages, Apr. 5, 2013.

\* cited by examiner

SYSTEM AND METHOD FOR MANAGEMENT OF NETWORK-BASED SERVICES

RELATED APPLICATION

This application claims priority to U.S. Provisional Patent Application Ser. No. 61/580,564, entitled "Improved Networking," which was filed on Dec. 27, 2011 and is hereby incorporated by reference.

TECHNICAL FIELD

This disclosure relates generally to computer networks and more particularly to a system and method for management of network-based services.

BACKGROUND

In network-based service provision, certain providers follow an approach where low-level application programming interfaces (APIs) are exposed and allow developers to build customized services. This approach pushes the complexity of service creation from the provider into the customer of the service. A customer invests in building custom solutions and is responsible for the design of service. If the service provider decides to incorporate such custom solutions as part of their offerings, complexity grows rapidly. The complexity grows linearly with the number of unique combinations and exponentially with the number of services within a combination. The rapid increase in complexity makes services brittle and hard to modify.

Most cloud services use HTTP web-services (SOAP and REST) to distribute service information and access and manage services. This model has shortcomings. First, HTTP was not designed for service discovery and publishing, but only to connect to hosts after they have been discovered through other means. Second, HTTP does not interact with policy in packet treatment. Service packets need to be policy routed and may be modified based on policies. Third, to authenticate, authorize and account (AAA), all HTTP packets must be intercepted (or terminated) at some proxy.

SUMMARY

In one embodiment, a system includes an interface configured to receive a first request sent from a first customer for a first service provided by a first service provider, the first request being of a first type. The system also includes at least one processor configured to determine a first set of configuration parameters from a first policy associated with the first service provider in response to receiving the first request. The at least one processor also causes a node associated with the first service provider to provide the first service in response to receiving the first request using the first set of configuration parameters.

In some embodiments, the first request may include a dotted decimal name associated with the first service. The at least one processor may further be configured to verify that the first request complies with a set of rules associated with the first type and validate the first request by comparing the first request to information about the first service. The first request may include a first portion, the first portion comprising information independent of how the first service is implemented. The first request may also include a second portion, the second portion comprising information dependent on how the first service is implemented.

In one embodiment, a method executed by at least one processor includes receiving a first request sent from a first customer for a first service provided by a first service provider, the first request being of a first type. The method also includes determining a first set of configuration parameters from a first policy associated with the first service provider in response to receiving the first request. In addition, the method includes causing a node associated with the first service provider to provide the first service in response to receiving the first request using the first set of configuration parameters.

Depending on the specific features implemented, particular embodiments may exhibit some, none, or all of the following technical advantages. Service deployments may cross customer and service provider boundaries. Each customer or service provider may be able to enforce policy rules for service usage at ingress and egress points. As another example, separate service-dependent and service-independent functions may be defined in a network. Other technical advantages will be readily apparent to one skilled in the art from the following figures, description and claims.

BRIEF DESCRIPTION OF THE DRAWINGS

Reference is now made to the following description taken in conjunction with the accompanying drawings, wherein like reference numbers represent like parts and which.

DESCRIPTION OF EXAMPLE EMBODIMENTS

Figure 1:
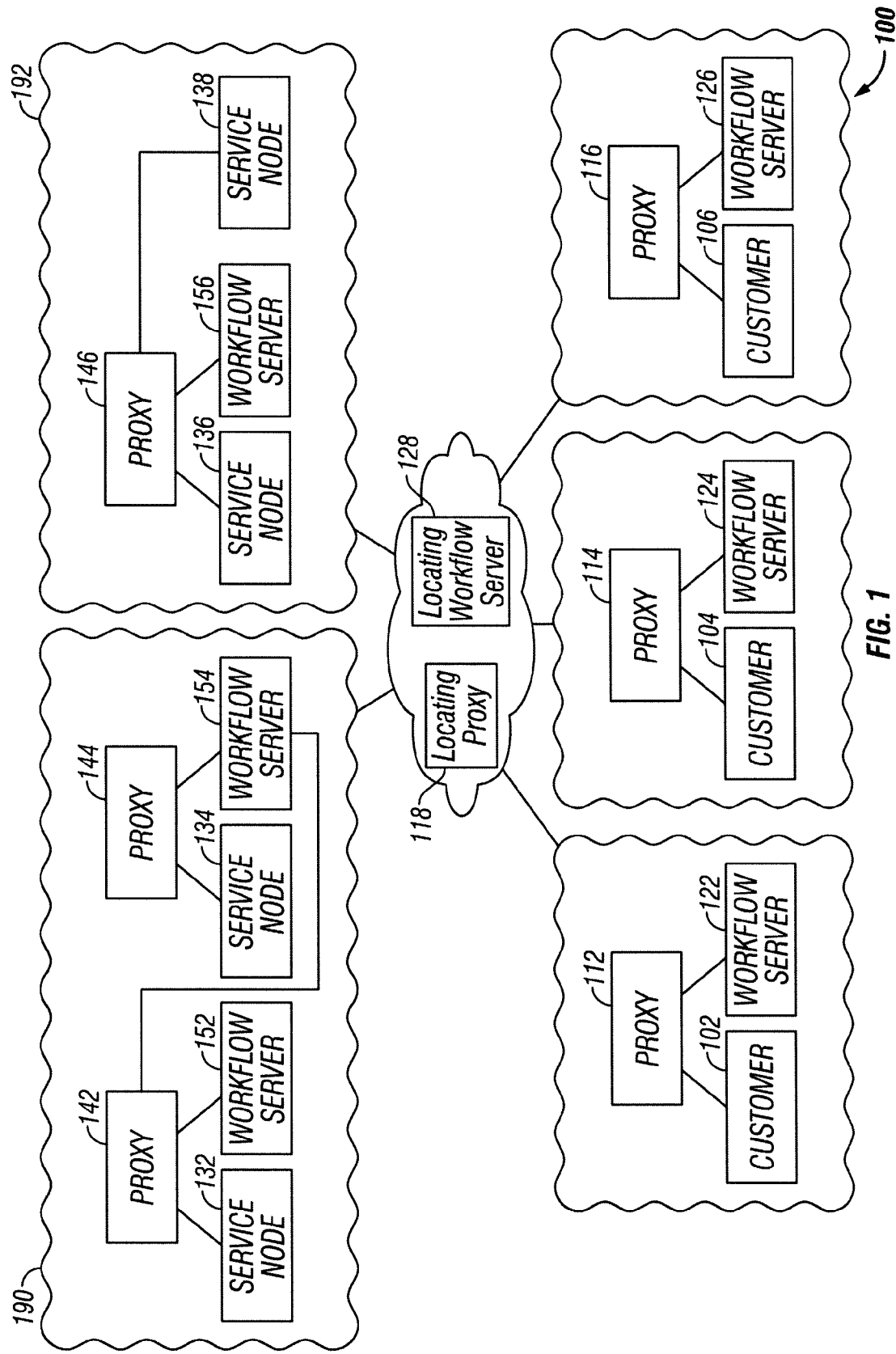
FIG. 1 illustrates one embodiment of a system that allows for interoperation between network-based service providers.

FIG. 1 illustrates one embodiment of system 100 that allows for interoperation between network-based service providers. System 100 includes customer nodes 102, 104, and 106 that receive network-based services provided by service nodes 132, 134, 136, and 138. Customer nodes 102, 104, and 106 are coupled to proxies 112, 114, and 116, respectively, which assist in management of services received from service nodes 132, 134, 136, and 138. Workflow nodes 122, 124, and 126 are coupled to proxies 112, 114, and 116, respectively, and facilitate the use of services provided by service nodes 132, 134, 136, and 138. Proxies 112, 114, and 116 are coupled to locating proxy 118 (associated with locating workflow node 128). Proxies 142, 144, and 146 (associated with service nodes 132, 134, 136, and 138) are also coupled to locating proxy 118. Locating proxy 118 functions to identify the appropriate one of proxies 142, 144, and 146 when receiving a message associated with a service provided by one of service nodes 132, 134, 136, and 138 from one of proxies 112, 114, and 116. Service nodes 132 and 134 are located in data center 190 while service nodes 136 and 138 are located in data center 192. In the depicted embodiment, service node 132 is coupled to proxy 142; service node 134 is coupled to proxy 144; and service nodes 136 and 138 are both coupled to proxy 146. Workflow server 156 is coupled to proxy 146.

System 100 depicts various nodes coupled via one or more electronic networks. Such networks may be implemented using an ad hoc network, a personal area network (PAN), a local area network (LAN), a wide area network (WAN), a metropolitan area network (MAN), and/or one or more portions of the Internet. One or more portions of one or more of these networks may be wired or wireless. As examples, a network may be implemented using one or more of a wireless PAN (WPAN) (e.g., a BLUETOOTH WPAN), a WI-FI network, a WI-MAX network, a Long Term Evolution (LTE) network, a cellular telephone network (e.g., a Global System for Mobile Communications (GSM) network), or other suitable wireless network.

In some embodiments, data centers 190 and 192 may represent a collection of hardware devices that serve to host multiple applications used by customer nodes 102, 104, and 106 using one or more networks as discussed above. Data centers 190 and 192 may include one or more networks that allow for communication sessions. Multiple service providers may use aspects of the infrastructure of data centers 190 and 192 to provide services. For example, a service provider may have an agreement with an entity associated with data center 190 wherein the service provider may utilize one or more of service nodes 132 and 134 to provide one or more services. As a result, in some embodiments, multiple service providers may utilize the same hardware resources of data center 190 or may reside on the same network or subnetwork. Virtualization techniques may be used to provide multiple service providers access to physical hardware resources of data centers 190 and 192. For example, services by service providers may be implemented using virtual machines.

In some embodiments, customer nodes 102, 104, and 106 may be nodes used by entities (e.g., users or service providers) that use services provided by service nodes 132, 134, 136, and 138. As examples, customer nodes may represent an end-user, a service provider who sources services from other service providers and combines them with their own services, or a third party service provider that aggregates services from multiple providers. For example, a business entity that enters into an agreement with a service provider to source cloud services for their users may be represented by customer nodes 102, 104, and 106. As another example, a customer may be an enterprise that buys cloud services. In some embodiments, a customer may define policies for service and may authenticate its users. Customer nodes may be implemented using a computer, workstation, telephone, Internet browser, electronic notebook, Personal Digital Assistant (PDA), computer tablet, or any other suitable device (wireless, wireline, or otherwise), component, or element capable of receiving, processing, storing, or communicating information with other components of system 100. As examples may be a smartphone, a desktop computer, a laptop computer, or an IP-enabled telephone. System 100 may include any suitable number of customer nodes that may be operated by any suitable number of users. Information stored in storage of customer nodes may each be implemented using any suitable structure for storing and retrieving information. Databases, file systems, tables, lists, or suitable combinations of these structures are examples of how such information may be stored. Computer-readable non-transitory storage media may be used such as: a semiconductor-based or other integrated circuit (IC) (e.g., a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, another suitable medium, or a suitable combination of these, where appropriate. A computer-readable non-transitory storage medium may be volatile, non-volatile, or a combination of volatile and non-volatile, where appropriate.

In some embodiments, each of service nodes 132, 134, 136, and 138 may be a hardware or software entity (e.g., a virtual machine) that provides a service. The service can be hardware resources (e.g., compute, network, security, storage, or other suitable services); platform and middleware resources (e.g., HTTP servers, application server frameworks, databases, messaging middleware, or other suitable resources) and applications (e.g., supply chain, communication, collaboration, e-governance, or other suitable applications). A service provider may be a supplier of cloud services to cloud customers and users (e.g., customer nodes 102, 104, and 106) per some business agreement. As an example, the service may be a virtual instance of a hardware or software product that can be owned by a customer or user for their personal use. Software running on one or more of such computing systems may perform one or more steps of one or more methods described or illustrated herein or provides functionality described or illustrated herein. Such computing systems may be in any suitable physical form. As examples and not by way of limitation, a computing system may be a virtual machine (VM), an embedded computer system, a system-on-chip (SOC), a single-board computer system (SBC) (e.g., a computer-on-module (COM) or system-on-module (SOM)), a desktop computer system, a laptop or notebook computer system, an interactive kiosk, a mainframe, a mesh of computer systems, a server, an application server, a router, a switch, or a combination of two or more of these. Where appropriate, computing systems may: be unitary or distributed; span multiple locations; span multiple machines; or reside in a computing cloud (e.g., a networked-set of computing systems), which may include one or more cloud components in one or more networks. Where appropriate, one or more computing systems may perform without substantial spatial or temporal limitation one or more steps of one or more methods described or illustrated herein. As an example and not by way of limitation, one or more computing systems may perform in real time or in batch mode one or more steps of one or more methods described or illustrated herein. One or more computing systems may perform at different times or at different locations one or more steps of one or more methods described or illustrated herein, where appropriate.

Information stored in storage of service nodes may be implemented using any suitable structure for storing and retrieving information. Databases, file systems, tables, lists, or suitable combinations of these structures are examples of how such information may be stored. Computer-readable non-transitory storage media may be used such as: a semiconductor-based or other integrated circuit (IC) (e.g., a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, another suitable medium, or a suitable combination of these, where appropriate. A computer-readable non-transitory storage medium may be volatile, non-volatile, or a combination of volatile and non-volatile, where appropriate.

Figure 4:
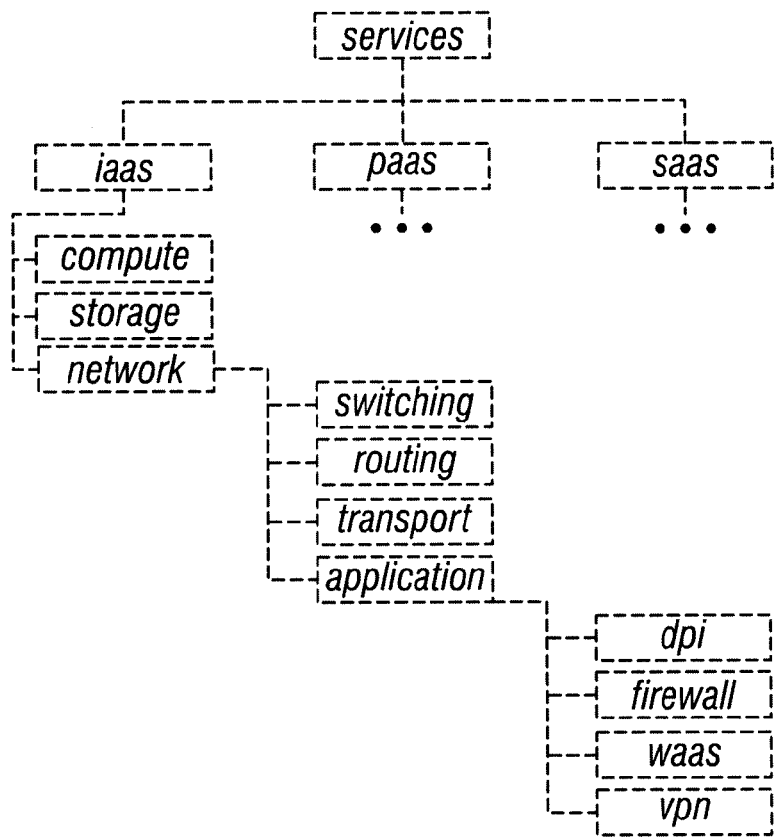
FIG. 4 illustrates an example of a hierarchical naming scheme.

In some embodiments, system 100 may use a classification scheme to name services. Classification may allow the combining of attributes across similar types of services. An object oriented approach may be used to define service domains. As examples, "network" can be a root domain, "switching", "routing" and "services" can be child domains of the root "network" domain, and "security" and "packet inspection" can be child domains of the "services" domain. Labeling of such relationships, for example, may be accomplished by a dotted decimal name. FIG. 4 illustrates an example of a hierarchical naming scheme. Examples of names taken from FIG. 4 may be "iaas.network.switching" and "iaas.network.security" as well as others. Child domains may inherit parameters defined in the parent domain. A child domain may override the parent domain's attributes by redefining them in the child domain. Using domain naming, proxies such as proxies 142 and 144 may advertise domains and users (e.g., associated with customer nodes 102, 104, and 106) who access the services will access them based on which domain of service they prefer. This may serve to, in some embodiments, abstract the service implementation from the service user. XML schemas can be used to implement the classification scheme. Inheritance of attributes in the classification scheme may also be provided. For example, "routing" and "switching" domains may inherit the "network" domain and a "virtual firewall" domain will inherit both the "firewall" and "virtual machine" domains. Through inheritance, large portions of a domain's attributes can be automatically re-used in some embodiments.

In some embodiments, each service domain can have its own service specific parameters. They can reuse existing parameters by inheriting an existing domain. Each domain may be associated with its own schema and that may allow a proxy validate a request before forwarding it even without details of a domain and its associated parameters. The parameters of a domain can be defined in a service dependent way, but it may still be generalized to apply to a wide variety of services in that domain. These parameters may be represented through XML, text, binary, or other kinds of formats.

In some embodiments, vendor specific attributes (VSAs) may be used in conjunction with service domains. These attributes may not be understood by all clients or users. These may, however, be understood between select endpoints that choose to use such attributes. Using VSAs, experimental domains or vendor-specific domains may be defined.

In some embodiments, proxies 142, 144, and 146 may receive requests (e.g., from other proxies 142, 144, and 146 or from customer nodes 102, 104, and 106) and execute them on behalf of services provided by service nodes 132, 134, 136, and 138. In some embodiments, the use of proxies 142, 144, and 146 is directed to functions related to service management that are not dependent on the details of a particular service (such as service creation and service deletion). Proxies may be implemented using one or more computing systems. Software running on one or more of such computing systems may perform one or more steps of one or more methods described or illustrated herein or provides functionality described or illustrated herein. Such computing systems may be in any suitable physical form. As examples and not by way of limitation, a computing system may be a virtual machine (VM), an embedded computer system, a system-on-chip (SOC), a single-board computer system (SBC) (e.g., a computer-on-module (COM) or system-on-module (SOM)), a desktop computer system, a laptop or notebook computer system, an interactive kiosk, a mainframe, a mesh of computer systems, a server, an application server, a router, a switch, or a combination of two or more of these. Where appropriate, computing systems may: be unitary or distributed; span multiple locations; span multiple machines; or reside in a computing cloud (e.g., a networked-set of computing systems), which may include one or more cloud components in one or more networks. Where appropriate, one or more computing systems may perform without substantial spatial or temporal limitation one or more steps of one or more methods described or illustrated herein. As an example and not by way of limitation, one or more computing systems may perform in real time or in batch mode one or more steps of one or more methods described or illustrated herein. One or more computing systems may perform at different times or at different locations one or more steps of one or more methods described or illustrated herein, where appropriate.

Information stored in storage of proxies may be implemented using any suitable structure for storing and retrieving information. Databases, file systems, tables, lists, or suitable combinations of these structures are examples of how such information may be stored. Computer-readable non-transitory storage media may be used such as: a semiconductor-based or other integrated circuit (IC) (e.g., a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, another suitable medium, or a suitable combination of these, where appropriate. A computer-readable non-transitory storage medium may be volatile, non-volatile, or a combination of volatile and non-volatile, where appropriate.

Service management may include creating, modifying, moving or deleting services. Service management may involve one or more actions performed in sequence or in parallel. These actions could be invoked on hardware and software services or on other cloud providers. Such functions may be abstracted from the rest of the network. For example, proxies may be unaware of service, user or policy nuances. A proxy, in various embodiments, may perform the following functions:

advertise its presence as a network element that can facilitate service transactions for certain types of services;

connect to other proxies and exchange service related information to allow for a distributed network of service proxies (e.g., proxies 112, 118, 142, and 146) that exchange service information. This may include routing rules to direct service requests to a destination based, for example, geographical nearness, service rate or costs, or service level agreements. Routing rules may be enforced and dynamically changed;

discover service nodes and their service capabilities and create a registry that service nodes, customer nodes, or other proxies can query to discover types of services available. Customer nodes 102, 104, and 106 as well as service nodes 132, 134, 136, and 138 connect to proxies 112, 114, 116, 118, 142, 144, and 146 that collect and distribute service information. Such proxies may reflect agreements between customers and service providers;

discover user locations and presence status (e.g., for users associated with customer nodes 102, 104, and 106) through user registrations and indication of service interests. This may be helpful because location may be a consideration in delivering services, since certain services may be routed differently based on locations or may be forbidden access or allowed restricted access only;

connect to policy databases that determine the rules by which a service request is routed to the next hop or how a service request may be modified or translated prior to routing. Policy routing of service requests allow for customers and providers to control service transactions through single points of control in the network. A customer node (e.g., customer node 102) may be able to enforce policies on a user or group basis. Such policies may validate whether a user is authorized to access a type of service, and reject unauthorized requests. Automatic changes to requests based user or group policies before the request exits the premises may be provided. A service provider might similarly reject or modify requests based on policies before a request is forwarded to an internal network associated with the service (e.g., an internal network associated with service node 132). Modifications may be based on specific service level agreement (SLA) rules and/or prior agreements. As examples, requests may be rate-limited and/or prioritized. Policy treatment of requests may be enforced at multiple points in a system (e.g., customer node 102, proxies 112, 142, and 146, and service node 132);

authenticate, authorize, and account for services. A proxy may intercept requests and challenge the client to authenticate itself. It may then lookup a policy database to validate that the user is authorized to make service transactions. After services have been created, periodic accounting may also be performed. Existing protocols such as RADIUS or DIAMETER may be used for this purpose. A proxy (e.g., proxy 112) may authenticate users based on internal user databases and forward the request to a service provider proxy (e.g., proxy 142) with its credentials. This may isolate security domains and establish trust boundaries. A proxy may be used to detect security breaches and attacks on the cloud through stateful inspections. Logging of transactions may be done at a proxy.

Regardless of the kind of service that is being offered, common actions may be performed such as service discovery, creation, modification, deletion, and migration, among others. Further, reliable confirmation and cancellation of requests or indicating successes and failures upstream may be provided. Cloud computing may involve many such actions which are service independent. As examples, if a virtual machine, a virtual private network, or a storage service, a "create" action can be used to indicate the operation of service creation. This common "create" action can be used for a variety of create tasks by proxies 112, 114, 116, 118, 142, 144, and 146, and its meaning can depend on the receiver.

Requests for service may be forwarded by a proxy to a service node (e.g., service nodes 132, 134, 136, and 138), other proxies (e.g., proxy 112 may forward a service request received from customer node 102 to locating proxy 118), or workflow nodes (e.g., workflow nodes 122, 124, and 126). A network of interoperable networks (e.g., datacenters 190 and 192) may use multiple proxies. A proxy may inspect or modify packets in transit. In some embodiments, locating proxy 118 may perform loadbalancing, locating, and security functions while forwarding requests received from proxies (e.g., proxies 112, 114, and 116) to a proxy associated with the requested service (e.g., proxies 142, 144, and 146). As an example operation, customer node 102 may request a service and proxy 112 may route the request to the right location. Proxies discover and monitor services. Proxies may also authenticate service providers and customer nodes, so that unwanted users or services cannot get into the service routing data and procedures. A proxy may forward responses back to other proxies and customer nodes. A proxy may statefully inspect packets and insert or remove headers.

In some embodiments, a proxy may operate in one of two modes: transparent and aggregated. A proxy operating in transparent mode does not aggregate services; it forwards messages transparently. A proxy operating in aggregate mode aggregates services and publishes them as aggregates. In the aggregated mode, a single proxy may publish a wide variety of services to their users, although these services are in turn managed by other proxies.

A proxy is typically located at the premises of an associated node (e.g., an associated service node or customer node). A proxy handling a request of an associated node may be located at the edge of a network that includes the associated node and perform functions of egress control. In some embodiments, a proxy may be located inside a service provider's network even though it is associated with a node requesting a service. For example, a proxy associated with a software-as-a-service (SaaS) node may send a query for an infrastructure-as-a-service (IaaS) service and both the SaaS and IaaS may be implemented in a network of a particular service provider. In this case, the proxy associated with the SaaS node would be located inside a provider's network.

One or more of proxies 142, 144, and 146 may be defined to cater to specific customers, service-types (e.g., a compute service or a storage service), or locations. For example, proxy 146 may be set to service requests from customer nodes 102 and 104 because they have been guaranteed a certain level of service. One or more of proxies 142, 144, and 146 may orchestrate services in a given geography.

One or more of proxies 142, 144, and 146 may control service management across multiple resources or resource domains. For example, proxy 142 may manage services such as compute, storage, network, and security services. One or more of proxies 142, 144, and 146 may instantiate multiple service instances based on a single request, and may be used to setup a complete virtual datacenter on a single request. Error or failure scenarios may be handled by one or more of proxies 142, 144, and 146; for example, rollback actions may be triggered. A proxy associated with a service node may discover services, allow service registrations, and publish aggregates of services to upstream locating proxies (e.g., locating proxy 118). Such a proxy is also responsible for accounting for service usage. Proxies may use timers and detect timeouts on requests. These timers may be used to expect a response to a request within the specified time-frame. When the timer expires, recovery actions should be possible. This may also be useful in case of network failures, and on-going transactions can be automatically reversed. Through use of timers, and automated reversal, failures may not result in leaked resources, incorrect accounting, or other problems.

One or more of proxies 142, 144, and 146 may become the anchor for complex services that are outside the domain of its own control. For example, proxy 142 may create a pool of virtual machines and may run out of resources and direct a request to locating proxy 118 to find additional resources in another location (e.g., service node 134 associated with proxy 144). A proxy may be configured to sequence and parallelize messages within a single context. Sequences or parallelization would depend on the specific needs of a particular kind of service. For example, compute and network services may be provisioned in parallel, while workload movement across geographical regions must take place sequentially. Accordingly, the responses to such requests may also be received in sequential or parallel fashion. When managing requests in a parallel or sequential fashion, it should be possible to commit these operations as a whole. If errors are encountered in any one of the transactions, it should be possible to cancel the entire service context as a whole.

In some embodiments, workflow nodes 122, 124, 126, 128, 152, 154, 156 are service-dependent network elements (i.e., functions performed by workflow nodes depend upon the details of a particular service). This includes service authorization, service level agreements (SLAs) for those services, location preferences, charging policies, processes for fulfilling requests, and other suitable functions. These policies may be available as syntax and semantics validation procedures that can be applied by a workflow node to received requests. If the validation fails, the requests may be rejected. To apply customer specific rules, a workflow node may know about users (e.g., at customer nodes 102, 104, and 106) and their location. To apply service specific rules, a workflow node may know about service availability and location. A workflow node may be implemented using one or more computing systems. Software running on one or more of such computing systems may perform one or more steps of one or more methods described or illustrated herein or provides functionality described or illustrated herein. Such computing systems may be in any suitable physical form. As examples and not by way of limitation, a computing system may be a virtual machine (VM), an embedded computer system, a system-on-chip (SOC), a single-board computer system (SBC) (e.g., a computer-on-module (COM) or system-on-module (SOM)), a desktop computer system, a laptop or notebook computer system, an interactive kiosk, a mainframe, a mesh of computer systems, a server, an application server, a router, a switch, or a combination of two or more of these. Where appropriate, computing systems may: be unitary or distributed; span multiple locations; span multiple machines; or reside in a computing cloud (e.g., a networked-set of computing systems), which may include one or more cloud components in one or more networks. Where appropriate, one or more computing systems may perform without substantial spatial or temporal limitation one or more steps of one or more methods described or illustrated herein. As an example and not by way of limitation, one or more computing systems may perform in real time or in batch mode one or more steps of one or more methods described or illustrated herein. One or more computing systems may perform at different times or at different locations one or more steps of one or more methods described or illustrated herein, where appropriate.

Information stored in storage of workflow nodes may be implemented using any suitable structure for storing and retrieving information. Databases, file systems, tables, lists, or suitable combinations of these structures are examples of how such information may be stored. Computer-readable non-transitory storage media may be used such as: a semiconductor-based or other integrated circuit (IC) (e.g., a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, another suitable medium, or a suitable combination of these, where appropriate. A computer-readable non-transitory storage medium may be volatile, non-volatile, or a combination of volatile and non-volatile, where appropriate.

A workflow node may receive this information from an associated proxy on a periodic basis or whenever the information changes. For example, a workflow node may subscribe for updates with an associated proxy (e.g., workflow node 122 may be subscribed to updates from proxy 112). In some embodiments, a workflow node can include device and service specific configurations. These configurations can be mapped to device or service capabilities identified by meta-attributes. While the meta-attributes describe the capability at a high-level, the configurations stored in a workflow node will involve detailed configurations. These could include command-line interface commands, text or XML configurations, or even binary formatted application-specific configurations. A workflow node can use the meta-attributes to construct a configuration for a particular resource (or device). A workflow node may also store this configuration against a unique identifier to be used later for querying the configuration out of the workflow node.

Workflow nodes include workflow definitions along with policies to validate or modify workflows in service requests. As an example, service, user and policy information can be encoded in an abstract language like the extensible markup language (XML). In such an example, a workflow may be an XML document. Workflows may include tasks and may represent the order in which tasks must be executed. A task in a workflow may include a definition of actions that need to be taken for that task. Tasks may be operations that a proxy can perform. To execute a task, a proxy may send or receive an appropriate message. A workflow may be referenced by a workflow name. A customer node (e.g., customer node 102) may request a service bundle by invoking a workflow name. Workflows may be stored in workflow nodes (e.g., workflow nodes 122 and 152). Workflow nodes may be situated at various points in the network(s) (as illustrated in FIG. 1). A workflow node may be configured to associate a workflow name with a workflow (e.g., an XML document that include tasks). A workflow node can perform service-specific validations by validating the workflow request against the service specific syntax and semantic validation procedures stored in that workflow node. In an example where the language to describe syntax and semantics is standardized, a workflow node (e.g., workflow node 152) can support multiple new service combinations through configuration alone without needing proxies (e.g., proxy 142) to be upgraded to support new services.

When using an XML definition of workflows and tasks, validation rules can be defined by, for example, using an XML Schema Definition (XSD) to validate syntax and using an Object Constraint Language (OCL) to validate semantics of a workflow request. When a workflow request arrives, the requested workflow can be validated against the associated schemes already defined in XML or other abstract languages. If a request fails validation according to syntax and semantic rules already defined in a workflow node, the request may be rejected. The rules may also specify how to modify all or selected requests before forwarding them downstream (e.g., from workflow node 152 to service node 132). The collection of all the syntax and semantic rules constitute a policy framework. A policy framework may be centralized at the provider, at the customer, or distributed between the provider and customers. Accordingly, the requests may be modified and/or validated multiple times.

A policy may be associated with a user (e.g., of customer node 102), such that the user can modify personalized policies about services. A policy may be associated with a service (e.g., provided by service node 132), and the service vendor may provide a configurable system for policy controlling each service, which the service provider can customize to suit the needs of their deployment. A policy may be associated with a proxy (e.g., proxy 142), which may be defined either by a service provider, a customer, or jointly by a service provider and a customer. When policies are associated with proxies, clients and servers may be unaware of the policy. The complexity in managing policy rules can be reduced by centralizing the intelligence to define and apply policies in proxies. To apply these policies, client requests are intercepted, transformed, and routed according to the policies before they reach the service node. The nodes such as customer node 102 and service node 132 may be unaware of this behavior. The rules for controlling services requests can be defined through configuration. A proxy (e.g., proxy 112 or 142) can download policy rules for a service, and execute those rules on-demand.

In some embodiments, the separation of the control and policy planes allows the same control plane to be re-used for a variety of policies. Policies can now be defined through configuration instead of being programmed in a proxy. A common control plane can be used to manage all these services. Through this separation, a proxy (e.g., proxies 142 and 112) can be programmable and it may not include hardcoded service logic. Rather, proxies can be "programmed" through policies defined by users or service providers in a suitable manner (e.g., using a user-friendly language). This can ease service creation and customization of existing services while reducing overall management complexity.

One example of policies that may be applied in system 100 are routing policies. A service may be provided from multiple sources (e.g., service nodes 132 and 1344) and to route a request to the correct destination, various types of routing policies may be applied. For example, a service request may be routed to the geographically nearest provider. Or, it might be routed to a location that offers the cheapest service rate or, to a different location based on time of day. There can be routing rules based on SLAs. Each user's request may be routed differently based on their roles. There could be rules specific to a type of service, or routing may be determined by the locations that have the necessary capacity. Routing may be determined by legal or governmental regulations. These rules may be dynamically changed, and different rules may apply to different types of services, users, locations, roles, or other suitable targets. A service provider and a customer may independently or jointly define these policies, and enforce them at the customer edge, at the service provider edge, or both.

Another example of policies that may be applied in system 100 are security policies. Security in the context of services provided in system 100 can encompass a broad spectrum of issues spanning authentication, authorization and accounting (AAA). For example, a customer (e.g., at customer node 102) may authenticate its users based on internal user-databases, while a service provider (e.g., at service node 132) may be responsible for the authorization and accounting of the service request. As another example, a customer may be responsible for user-specific authorization and authentication while the service provider may be response for the accounting. As users join or leave a customer, the service provider may not own user-specific authentication and policies. The AAA functions are best performed at the service provider or customer edges. Each service may not be required to do AAA; it is inefficient and complex. Service nodes may be protected from denial-of-service attacks by preventing unauthorized requests from entering the network. Services may only be accounted as a bundle (e.g., network, compute and storage services may form a single service bundle) and not individually. Request logging for business analytics is can be done at the network level and not in individual services. A service provider may also wish to hide network topology of services, and may abstract all services from user-visibility. For example, a service provider may publish one interface to access services although these services are managed by service-specific proxies. These proxies may be situated in different locations.

Another example of policies that may be applied in system 100 are service policies. Complex services can use coordination of multiple resources. A virtual machine for example may need network attached storage, network based security and network quality of service. The virtual machine service may be regarded incomplete without the combination of all services. Some virtual machines may use network attached storage while others may not. Some virtual machines may need to offload denial-of-service attacks, while others may use encryption of data. Some services may use a specific amount of network bandwidth to be available. Policies associated with services can be abstracted from clients and service providers. Accordingly, when a client requests for a virtual machine, the request may be modified to include storage, security and quality of service requests before it reaches the service provider. Likewise, for example, if a user is not authorized to request high-end services, their requests might be automatically downgraded to the appropriate grade of service. This is a function of policies that a service provider and/or a customer can define. This means that a request for a virtual machine may do different things for different classes of users. Users may be upgraded or downgraded in the level of services, while using the same request. This means that the syntax and semantics of a request is not fixed in advance. Rather, it is determined based on context, and different factors may be used to modify these requests in transit. Syntax and semantics of a request may be restricted from an end-user perspective as well as a service provider perspective. Thus, a service node can support a superset of request parameters, to allow any user to access the service in different ways. A client can request a subset of those parameters, based on a prior customer or a service provider defined policies or SLAs. The validation and tweaking of request parameters in a user-specific manner should be controlled by a policy in transit. In effect, the requests that a client makes and the requests that a service node receives can be very different based upon the policies that modify the request in the middle.

A workflow node associated with a proxy that received a request for service from a customer node may be used to validate the request before allowing it to be forwarded. For example, workflow node 122 may validate a request from customer node 102 against the policies provisioned for a given user before forwarding the request. A workflow node may be used by a service provider to validate provider-to-provider requests before sending them to another service provider. The validations may be defined unilaterally or based upon agreements or defined SLAs.

In some embodiments, a workflow node may automatically trim or expand a requested workflow prior to execution. For example, to a virtual machine creation workflow, a workflow node may add tasks for storage, access control, quality-of-service provisions, and load balancing, even though such tasks were not in the original request. Policies used to govern the trimming or expanding of workflows may be defined by a user, a service provider, or mutually agreed upon as an SLA. Once a workflow has been defined, an associated proxy or service node can download the workflow and task definitions from a workflow node. In case of failures or service termination, a workflow node will determine action reversal, by flipping the individual tasks in the correct order.

In some embodiments, to add a new service, a new API combination may not be needed. Rather a new XML document may be created to validate syntax and semantics of the service request. New services can thus be added through configuration alone. With the ability to define and validate workflows, a user (e.g., at customer node 102) or a service provider (e.g., at service node 132) can create service bundles on-demand. Workflow nodes store all user or service provider defined workflows, which are referenced by a workflow name.

Proxies and workflow nodes may be designated for specific customers, service providers, and service types. One or both of proxies and workflow nodes may be deployed at multiple points in one or more networks, including but not limited to: (a) a customer or service provider egress, (b) a customer or service provider ingress, and (c) a customer or service provider intranet. Interaction between proxies and workflow nodes may be any-to-any (e.g., one proxy may interact with multiple workflow nodes for multiple service types and a workflow node may serve one type of service-dependent rules to multiple proxies that support the same service). FIG. 1 illustrates multiple examples of the any-to-any relationships between proxies and workflow nodes. A proxy may connect to multiple workflow nodes (e.g., proxy 142 is coupled to workflow nodes 152 and 154). A workflow node may be connected to multiple proxies (e.g., workflow node 154 is coupled to proxies 142 and 144). A distribution of proxies and workflow nodes as illustrated in FIG. 1 facilitates load-balancing. Workflow nodes advertise the workflows they support to proxies. Workflow nodes may also advertise class of users and service domains they can support. A proxy may use this information to forward appropriate service requests to appropriate workflow nodes. A proxy may advertise workflows it receives from associated workflow nodes to other proxies. This way, a proxy can know how to reach the particular proxy that can execute a requested workflow, and be able to route requests to it.

In some embodiments, locating proxy 118 aggregates service information and publishes aggregated information. Locating proxy 118 may be used to hide the service topology inside a service provider. For example, a service provider who supports multiple services (e.g., services provided by service nodes 136 and 138 in datacenter 192) may only publish its locating proxy address and internally route the requests to a dynamically or policy-selected proxy. Locating proxy 118 can also be used to implement high-availability of services by routing service requests to where the requests are best fulfilled. Locating proxy 118 may statefully inspect received requests and authenticate the senders before forwarding the requests further. It may rate-limit requests from a particular source, and may be capable of intrusion detection and prevention, for protecting an internal network from denial of service (DoS and DDoS) attacks. Nodes behind locating proxy 118 (e.g., proxies 142 and 144) may then assume that packets entering them are secure. This, in some embodiments, may obviate the need for service authenticating the user requests and building security defenses.

In some embodiments, locating workflow node 128 may have rules to forward requests based on policies. For example, locating workflow node 128 may determine that service requests from customer node 102 must be always directed to a definite location (e.g., datacenter 190). Locating workflow node 128 may choose the nearest service creation location, or route to a location that has resources available.

In some embodiments, locating proxy 118 may provide one or more functions as being a node at the border of a network. For example, locating proxy 118 may be considered to be at the border of datacenter 190 with respect to one or more of customer nodes 102, 104, and 106. As another example, locating proxy 118 may be considered to be at the border of datacenter 190 with respect to nodes in datacenter 192. A function that may be performed by locating proxy 118 is inspection of headers of request packets (e.g., a request packet sent form customer node 102 to service node 132). The inspection may include determining whether the request packet was sent or routed inadvertently or determining whether the request is malicious. Proxy 118 may also be configured to reject the request packet or sanitize the header of the request packet.

As another example, locating proxy 118 may insert headers into messages based on policies at the edge of a network. For example, datacenter 190 may have policies that apply to all incoming packets and locating proxy 118 may modify headers of packets sent to nodes in datacenter 190 according to one or more policies associated with datacenter 190. This may allow for a convenient method to apply policies at one point without users or nodes of a network (e.g., those in datacenter 190 or customer nodes 102, 104, and 106) to be familiar with such policies. A node can receive a packet modified by locating proxy 118 (e.g., service node 132). The modified messages can look like user-requested transactions.

As another example, locating proxy 118 may modify addresses. In some embodiments, locating proxy 118 may perform network address translation of messages regarding management of network-based services (such as the functions of proxies 142, 144, and 146 discussed above). This may serve to hide the network topology related to proxies 142, 144, and 146 as well as workflow servers 152, 154, and 156.

As another example, locating proxy 118 may detect and address concurrent requests from the same source (e.g., customer node 104 sending parallel request for services from service node 134. This can be problematic because resources may be allocated and released in parallel and can cause confusion in the system thereby leading to one or more security threats. Locating proxy 118 may be configured to forbid parallel requests and thereby protect the system.

As another example, locating proxy 118 may rate-limit requests from a single source (e.g., customer node 106 sending requests for service to service node 134). This may allow users (e.g., those associated with customer nodes 102, 104, and 106) to have a fair-share of services (e.g., those provided service nodes 132, 134, 136, and 138). A single user can potentially overload the system by sending, e.g., periodic analytic requests using automated mechanisms. Rate-limiting can reduce or prevent overuse.

As another example, locating proxy 118 may be involved with virtual private networking (VPN) or Internet Protocol Security (IPSec) sessions. Locating proxy 118 may perform public key authentication using key chains in order to validate that a user (e.g., associated with customer node 102) should have access to services (e.g., provided by service node 132). Locating proxy 118 can determine whether a user is authorized to receive a requested service.

As another example, locating proxy 118 can translate between different service request formats. For instance, a locating proxy 118 can translate between an externally exposed API (e.g., by service node 132) and an internal protocol for managing network-based services.

In some embodiments, system 100 depicts a user (e.g., at customer node 102) using cloud services from different cloud providers (e.g., provided by service nodes 132 and 136) using a common protocol (e.g., through communication between proxies 112, 142, and 146). This may allow the user to move across service providers or source the same service in a different geography from a different provider.

In some embodiments, system 100 depicts a user (e.g., at customer node 102) interoperating in-house or private clouds (e.g., of which customer node 102 is a part) with those in the service provider domain (e.g., a domain associated with service node 138). As an example, workloads may be moved between the private cloud associated with customer node 102 and a public cloud associated with service node 138 using communication between proxies 112 and 146. As another example, virtual services may be created using a common protocol in the public cloud associated with service node 138 as in the private cloud associated with customer node 102 via proxies 112 and 146.

In some embodiments, system 100 depicts a service provider (e.g., associated with service node 132) interoperating its service with another service provider (e.g., associated with service node 136) using proxies (e.g., proxies 142, 118, and 146). As an example, the service providers may source each other for services when demand grows. As another example, one service provider may use the other service provider's service as backup or for disaster recovery under an outage. Service providers may agree to host services in each other clouds where a workload moves between service providers located in different geographies. As another example, a service provider could source services across different service providers by using interoperability provided by proxies such as proxies 142, 144, and 146.

In some embodiments, system 100 depicts how a cloud provider may deliver many kinds of services, layered on top of one another. For instance, a SaaS service may use a platform-as-a-service (PaaS) service. A PaaS service (e.g., represented by service nodes 132 and 134) may use a IaaS service (e.g., represented by service nodes 136 and 138), network and security services, or other suitable services. A cloud provider may build services incrementally and interoperate services across tiers. This may avoid, for example, having to build a new IaaS system for every new PaaS service or a new PaaS service for every SaaS service. The interoperability may be provided using proxies (such as proxies 142 and 144) communicating with each other using a common protocol related to management of services.

In some embodiments, system 100 depicts how a cloud provider may source a service from more than one vendor. Examples of such services include compute virtualization, storage, network, and security. For example, customer node 104 may seek a service from service node 132, such as a SaaS service. In this example, service node 132 may source services associated with the offered SaaS service from service nodes 136 (e.g., offering a storage service) and 138 (e.g., offering a security service). Proxies 114, 142, and 146 may be used in such an example to allow for sourcing services from the multiple locations without requiring that customer node 104 being made aware of how services are being sourced. Such interoperability may be provided by the proxies communicating with each other using a common protocol related to management of services.

In some embodiments, system 100 may allow for customers to define service requests at various levels of granularity. For example, a customer may desire a single request to provision compute-storage-network and another customer may request these three services one by one. Such differing requests may take place at one or more points in system 100. For example, a service provider (e.g., associated with service node 132) might publish customer specific workflows (e.g., using proxy 142) and translate them at the edge of a cloud. As another example, a service provider may publish workflows that are translated into detailed tasks to be executed by another service provider. As another example, a customer (e.g., associated with customer node 106) may define workflows that are translated as a request leaves the customer premise (e.g., at proxy 116).

Figure 2:
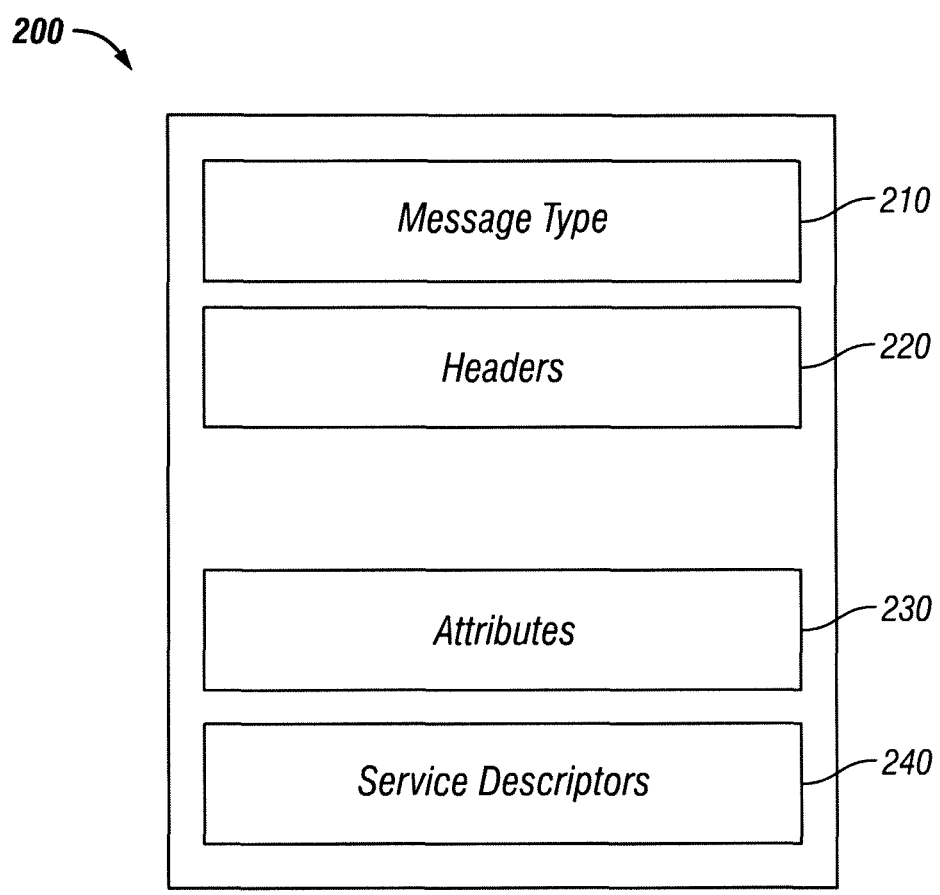
FIG. 2 illustrates an example packet that may be used in the operations of system depicted in FIG. 1.

FIG. 2 illustrates an example packet 200 that may be used in the operations discussed above with respect to system 100 of FIG. 1 and discussed below with respect to FIGS. 3-12. Packet 200 illustrates, in some embodiments, a protocol scheme with two protocols: a Service Orchestration Protocol (SOP) (included in portions 210 and 220 of packet 200) and a Service Description Framework (SDF) (included in portions 230 and 240 of packet 200). SOP carries service-independent information (e.g., information independent of how the service referred to in portions 230 and 240 is implemented) while SDF carries service-dependent information (e.g., information dependent on how the service referred to in portions 230 and 240 is implemented). SDF payloads can be attached in SOP messages as packet 200 indicates. In some embodiments, through separation of service-independent and service-dependent pieces, the scheme described here can be extended to any service type in an interoperable way. SOP uses text-based headers. This may facilitate implementation of SOP as well as extending SOP (e.g., by adding new text headers). These messages may be inspected at proxies (such as proxies 118 and 142) and modified by them. Authentication can be done, for example, similar to authentication procedures in Session Initiation Protocol (SIP). As other examples, authentication may be implemented using IPSec, TLS or other encryption and privacy mechanisms already being used with HTTP.

In some embodiments, headers 220 include fields with names and values. The order of fields is not specified in a SOP message but it may be helpful if fields relevant to service routing (To, From, Exchange, Via) are present at the top of the message to facilitate rapid processing. Example message name headers:

CREATE 1 SOP/1.0
GET 1 SOP/1.0

The number following the Message Type indicates if the message is being re-transmitted as the same message in the same transaction. This number can be incremented by a sender whenever a message is re-transmitted. A receiver may give higher priority to re-transmitted messages.

The following are messages that may be used in SOP:

DISCOVER—Used by a service node to discover a proxy
ADVERTISE—Used by a proxy to advertise its presence
REGISTER—Used by a service node to register itself with a proxy
PUBLISH—Used by a service node to indicate its capabilities
SUBSCRIBE—Used by a workflow server/client to subscribe to service information
CREATE—Used by a proxy to request service creation
DELETE—Used by a proxy to request service deletion
UPDATE—Used by a proxy to request service update
GET—Used by a proxy/service node to get service/workflow details
TRANSFER—Used by a proxy to request service mobility
COMMIT—Used by a proxy to commit service changes
CANCEL—Used by a proxy/client to cancel operations
WORKFLOW—Used by a proxy/client to execute a workflow A proxy can advertise its presence along with the ability to proxy for certain services. A service node can discover service-specific proxies by listening to proxy advertisements. A service node should also be able to trigger service discovery, e.g., because the service node may have been out of service when the proxy advertised its presence. Two messages may be used in SOP—ADVERTISE and DISCOVER messages—to support proxy discovery. The proxy sends an ADVERTISE message to announce its presence and ability to handle some services. The service node may use a DISCOVER message to trigger the ADVERTISE message, if an ADVERTISE message has not been transmitted or if it was transmitted but the service node was not operational to receive it. In some embodiments, these two messages may be independent requests, and not related as request-response. A proxy may periodically send an ADVERTISE message to announce its presence. A service node may send a DISCOVER message whenever it starts up and if an ADVERTISE has not already been received. A proxy may send an ADVERTISE message in response to receiving a DISCOVER message if the service types in the DISCOVER message match with the service types supported by the proxy. The DISCOVER message may be broadcasted. The ADVERTISE message may be sent as a unicast. An ADVERTISE message sent in response to a DISCOVER message may be sent as a unicast message (the unicast address is derived from the received DISCOVER message).

After receiving an ADVERTISE message from a proxy, and if the service interests match, a service node, a workflow server, a user, or a proxy may register with the proxy. If a service node supports multiple services, it may register with those proxies that support those services. If a client is interested in services supported by multiple proxies, it may register with all of them. If a proxy is interested in exchanging service information with multiple proxies, it should register with them. Registration identifies the service node, workflow server, user or proxy to the registering proxy. A proxy receiving registration may initiate authentication during the registration. A proxy may interact with an AAA server to authenticate and/or challenge the registration identity. Registrations may be carried out periodically, and they may serve as a keep-alive mechanism with a proxy. A registration may be used to determine the location of a user, proxy, workflow server, or service node, and location based policies can be applied in service management.

In some embodiments, the ADVERTISE message may be sent by a proxy to advertise its presence and willingness to proxy for certain types of services. The SDF payload (e.g., included in attributes 230 and service descriptors 240 of packet 200) in the message indicates which service domains it can support. In the example message below, the proxy supports the iaas.compute domain of services. The message may carry a Registration-Timeout header. The message may also carry other Timer values and Retry counts as a way to globally configure all service nodes in the network uniformly. Example:

```
From: default@p.provider.com
To: default@default.provider.com
Exchange: 43shXui7236
Via: SOP/1.0/UDP default@p.provider.com;branch=k9DjR5lbcw
Timestamp: 1285162132
Sequence-ID: 13224 ADVERTISE
Registration-Timeout: 1000
Content-Type: application/sdf; charset=utf-8
Content-Length: 147
<?xml version="1.0" encoding="UTF-8"?>
<domain name="iaas.compute" type="capability" def="sdn"/>
```

In some embodiments, the DISCOVER message is sent by a service node to discover proxies that might be willing or capable to act as proxy for its services. The SDF content in the message indicates service capabilities in the service node. In the example below, the service node is capable of iaas.compute domain of services:

```
From: default@default.com
Via: SOP/1.0/UDP default@default.com;branch=k9DjR5lbcw
Timestamp: 1285162130
Sequence-ID: 1 DISCOVER
Content-Type: application/sdf; charset=utf-8
Content-Length: 147
<?xml version="1.0" encoding="UTF-8"?>
<domain name="iaas.compute" type="capability" def="sdn"/>
```

In some embodiments, the PUBLISH message is sent by a service node whenever its service capabilities change, when the Publish-Timeout timer expires, or after a service restart (after a registration), whichever comes earlier. This message indicates the current service availability of the service node to a proxy. The proxy will use the information given in the SDF payload to update its service database. The capabilities indicated here would be used by the proxy to route service requests towards the service node. The "capability" and "availability" inside the SDF indicate the total capacity and the capacity that is available currently. Example PUBLISH message:

```
From: default@4357254.provider.com
To: default@p.provider.com
Exchange: 43shXui7236
Via: SOP/1.0/UDP default@4357254.provider.com;branch=k9DjR5lbcw
Sequence-ID: 13432 PUBLISH
Distance: 1
Content-Type: application/sdf; charset=utf-8
Content-Length: 513
```

```
<?xml version="1.0" encoding="UTF-8"?>
<domain name="iaas.compute" type="capability" def="sdn">
    <!-- list of domain elements -->
</domain>
<domain name="iaas.compute" type="availability" def="sdn">
    <!-- list of domain elements -->
</domain>
```

In some embodiments, the REGISTER may be used by a service node, a proxy, a workflow server or a user to register with a proxy after a new proxy is discovered, or when the Registration-Timeout expires, whichever comes earlier. The Node-Type header informs the proxy about the type of registering entity. If the Node-Type header indicates a service-node, then the message may have the Transfer-Node header that indicates the type of mobility the service node supports. For other node-types, the Transfer-Node header may be absent. The REGISTER message is used by a proxy to establish the identity of the service node (e.g., its domain name and IP Address). The Proxy may initiate authentication procedures with the registering entity after the REGISTER message is received. If the registration fails, the proxy may not register the entity. The REGISTER message may be used by the proxy as a heartbeat or keep-alive mechanism. The proxy can be configured to de-register an entity if three successive Registration-Timeouts have expired, and remove all information related to that service. The proxy may initiate service recreation procedures for all services under that service node at another service node when that service node has been de-registered due to the expiration of the Registration-Timer. Example REGISTER message:

```
From: default@default.com
To: default@p.provider.com
Exchange: 43shXui7236
Via: SOP/1.0/UDP default@default.com;branch=k9DjR5lbcw
Sequence-ID: 1 REGISTER
Transfer-Mode: stateless
Node-Type: service-node
```

In some embodiments, the SUBSCRIBE message allows a SOP network element to request updates on a particular type of service capability. The SDF payload indicates the capabilities for which the requestor is subscribing. A workflow server can subscribe with the proxy for all updates to services and all updates to user registrations. A user may subscribe with the proxy to receive workflow and service related updates. Example SUBSCRIBE message:

```
From: default@ws.provider.com
To: default@p.provider.com
Via: SOP/1.0/UDP default@ws.provider.com;branch=k9DjR5lbcw
Exchange: 43shXui7236
Timestamp: 1285162130
Sequence-ID: 1 SUBSCRIBE
Distance: 1
Content-Type: application/sdf; charset=utf-8
Content-Length: 154
<?xml version="1.0" encoding="UTF-8"?>
<domain name="iaas.compute" type="capability" def="sdn"/>
<domain name="users.company.com" type="capability" def="sdn"/>
```

In some embodiments, the TRANSFER message is sent by a proxy to initiate a service transfer. The From and To headers indicate the source and destination proxies. The Source and Destination headers indicate the source and destination service nodes. The Requestor header identifies the initiator of the transfer (e.g., a proxy). The TRANSFER message sets up a session that initiates a service transfer. It may not be responsible for actually transferring service state from one service node to another. For example, each service may choose its own methods to transfer state (such as FTP to transfer a file). The SDF payload in the TRANSFER message indicates to the destination service node the capabilities expected in the transfer. For example, these capabilities may indicate the total amount of memory or storage required to accept a moving virtual machine. The content of that memory is outside scope for SOP and to be handled separately. Example TRANSFER message:

```
From: default@p1.provider.com
To: default@p2.provider.com
Exchange: 4j253TyXuM6
Via: SOP/1.0/UDP default@p1.provider.com;branch=XsMf634d2W
Sequence-ID: 1 TRANSFER
Source: service1@4357254.provider.com
Requestor: default@p1.provider.com
Content-Type: application/sdf; charset=utf-8
Content-Length: 142
<?xml version="1.0" encoding="UTF-8"?>
<domain name="iaas.compute" type="capability" def="sdn">
    <!-- list of domain elements -->
</domain>
```

In some embodiments, the UPDATE message can be used by a proxy to request a service update to a service node. The UPDATE message refers to the task to be executed through the Task-ID header. The receiver of the request may obtain a description of the task by querying the workflow server with the Task-ID provided in the message. Example UPDATE message:

```
From: default@p.provider.com
To: default@4357254.provider.com
Exchange: 43shXui7236
Via: SOP/1.0/UDP default@p.provider.com;branch=k9DjR5lbcw
Sequence-ID: 134 CREATE
Task-ID: 67439375
Workflow-Server: ws.provider.com
Requestor: consumer@customer.provider.com
```

In some embodiments, the WORKFLOW message is used by a client or a proxy to initiate workflow execution. It contains the Workflow-Name that needs to be executed. It contains a reference to the prior Workflow-ID when the request involves deletion or transfer of a prior executed workflow. Example WORKFLOW message:

```
From: consumer@customer.com
To: default@p.provider.com
Exchange: 43shXui7236
Via: SOP/1.0/UDP default@p.customer.com;branch=k9DjR5lbcw
Sequence-ID: 5 WORKFLOW
Workflow-Name: gTyuI82Zx@provider.com
```

In some embodiments, SOP may include two kinds of service publishing. First, a service node publishes its capabilities to a proxy. Second, the proxy publishes the capabilities of the service node to other proxies and users. These publications build up the service routing tables in a network and users and proxies can know how to route a request to a service. Service publishing may use a PUBLISH message. This message is used in a request-response configuration so a response is sent by the receiver. A service node may send a PUBLISH message in part due to service virtualization. Service nodes may be capable of hosting multiple virtualized service instances. As those instances are allocated, the total virtualized capacity in the service node reduces. The service node may inform an associated proxy about its current capacity to host services. A proxy may aggregate these capacities and use them to determine the placement of services. A service node may send a PUBLISH message to an associated proxy in the following three cases, whichever comes first:

a. Periodically based on a time indicated by the proxy (in, e.g., an ADVERTISE message sent by the proxy). A proxy may set a service node's capabilities to null if three successive PUBLISH messages have not been received.

b. When a service node is started, to inform about its available capacity.

c. Whenever the service capabilities of a service node changes; this may be typically after a new service allocation or partial failure/outage.

A proxy may also send PUBLISH messages to other proxies and users to propagate service capabilities in the network. As new services are made available, or existing ones are removed, users may know the available list of services. A proxy can dynamically publish its catalogue of discovered services to a user. These publications can carry two kinds of information. They can have an aggregated view of service capabilities available via a proxy. This information is useful to a receiver to determine which services can be accessed via a publisher. The PUBLISH message can indicate which workflows can be requested through a proxy. Workflows may be tagged by service types. In some situations, publishing an aggregated view of services may be undesirable as it may expose a provider's internal details to other providers or users. The PUBLISH message may, however, carry aggregated services to a limited set of trusted proxies. It may carry workflows to users or proxies that may use the workflows. To avoid flooding, a user or proxy can indicate its service interests by sending a SUBSCRIBE message to a proxy. The SUBSCRIBE message can indicate the sender's service interests, which act as a filter for a proxy to forward those service-specific details. A proxy may use information gleaned during registration to determine which users and proxies should be forwarded which information. For example, it might forward aggregated service information to proxies within a trust zone, but send workflows to external users.

Separating DISCOVER/ADVERTISE messages from PUBLISH/SUBSCRIBE messages is that the ADVERTISE/DISCOVER messages may be broadcasted without responses to them whereas the PUBLISH/SUBSCRIBE messages are always unicast and every message has a response. Both REGISTER and PUBLISH messages indicate a service node's information to a proxy. In some embodiments, the difference between them is that a REGISTER message informs a proxy about the service node's identity (domain name and IP address) whereas a PUBLISH message informs a proxy about its Service Domain Name (SDN) and capabilities. Similarly, a REGISTER message informs a proxy about the user's identity (domain name and IP address) whereas a SUBSCRIBE message informs the proxy about the user's service interests. Hence, in some embodiments, distinctions exist between capability and interest as described in service domain name information and identity which is in terms of DNS and IP. A reason to keep REGISTER messages separate from PUBLISH/SUBSCRIBE messages is to separate identity (e.g., DNS and IP) from service information. Identity is associated with authentication, and if a user or service node have been authenticated, this identity may be usable across all service requests. Authentication may not be required in every service transaction. Having identity validation associated with REGISTER messages allows for other requests to use that identity and obviates the need to authenticate the user or service node separately. REGISTER messages may be used as a single sign-on feature for services.

In some embodiments, service management performed by proxies involve at least five functions: CREATE, DELETE, UPDATE, GET and TRANSFER. CREATE, DELETE, and UPDATE functions address the creation, deletion, and updating of services. The GET message requests a description of the service or workflow or tasks depending on the context. For example, a GET message can fetch the total allocated size of a storage disk but is usually not used to determine the content of that disk. The TRANSFER message addresses service virtualization and movement of services. The TRANSFER message sets up the context in which service information may be transferred from one point to another, such as the source and destination addresses and the type of information to be transferred. Actual transfers may be determined by the service itself (such as use of SFTP to transfer memory snapshots when moving a virtual machine).

In some embodiments, the CREATE message is used by a proxy to request a service creation to a service node. The CREATE message refers to the task to be executed through the Task-ID header. The receiver of the request can obtain a task description by querying the workflow server with the Task-ID provided in the message. Example CREATE message:

```
From: default@p.provider.com
To: default@4357254.provider.com
Exchange: 43shXui7236
Via: SOP/1.0/UDP default@p.provider.com;branch=k9DjR5lbcw
Sequence-ID: 134 CREATE
Task-ID: 67439375
Workflow-Server: ws.provider.com
Requestor: consumer@customer.provider.com
```

In some embodiments, the DELETE message is used by a proxy to request a service deletion to a service node. The DELETE message refers to the task to be executed through the Task-ID header. The receiver of the request can obtain a task description by querying the workflow server with the Task-ID provided in message. Example DELETE message:

```
From: default@p.provider.com
To: default@4357254.provider.com
Exchange: 43shXui7236
Via: SOP/1.0/UDP default@p.provider.com;branch=k9DjR5lbcw
Sequence-ID: 134 DELETE
Task-ID: 67439375
Workflow-Server: ws.provider.com
Requestor: consumer@customer.provider.com
```

In some embodiments, the GET message is used by a service node to obtain a task description from a workflow server. It can be used by a proxy to request a service node description prior to a service transfer. It can be used by a proxy to obtain a workflow or task description from a workflow server. The context of the transaction determines which of these functions need to be achieved. Depending on the context, various headers must be present. To request a service node description, a proxy can include the Service-ID header to refer to the specific service whose description is required. To get a workflow or task description, the appropriate Workflow-Name, Workflow-ID or Task-ID headers are present. The Query-Type header can be present to describe the type of query. Example GET message:

```
From: default@p.provider.com
To: default@ws.provider.com
Exchange: 43shXui7236
Via: SOP/1.0/UDP default@p.provider.com;branch=k9oluElbcw
Sequence-ID: 286 WORKFLOW
Query-Type: workflow-name
Workflow-Name: gTyuI82Zx@provider.com
```

In some embodiments, SOP addresses reliability concerns that span multiple service nodes. An example service may require management across compute, network, storage, security, and other domains. Failure in a service node providing one of these services may trigger a rollback of actions in service nodes providing the other related services. This may be performed by sending a CANCEL message to the service nodes that are impacted by a failure. If, for example, all service nodes have been successfully invoked, then a COMMIT message is sent to the service nodes. Service transactions in SOP may be committed within a certain time period. For example, if the time for a commit to occur has elapsed, the service will be automatically canceled by the service node. This mechanism is helpful in scenarios where the user, the proxy, some service node or a combination of these fail. If the proxy has failed and does not send the COMMIT message to a service node, the service node can rollback the transaction. If the service node has failed and does not respond to the proxy, the proxy may send a CANCEL message to other proxies and/or service nodes. If a proxy has failed and does not respond to the user, the user, for example, can be assured that they are not billed for the service. As another example, the provider can be assured that unless a COMMIT message has been sent, service resources will not be leaking due to failures.

In some embodiments, the CANCEL message can be used to cancel a transaction that has not been committed in case of errors detected or in case of a timeout. The cancellation is a new transaction and it requires a response. The CANCEL message refers to a task to be cancelled through the Task-ID header. The receiver of the request may obtain a description of the task again by querying the workflow server with the Task-ID provided in the message. Example:

```
From: default@p.provider.com
To: default@4357254.provider.com
Exchange: 43shXui7236
Via: SOP/1.0/UDP default@p.provider.com;branch=khewui6GDw
Sequence-ID: 134 CANCEL
Task-ID: 67439375
Workflow-Server: ws.provider.com
Requestor: consumer@customer.provider.com
```

In some embodiments, the COMMIT message is used to commit CREATE, DELETE, UPDATE or TRANSFER transactions. This message is sent by a proxy to each service node involved in a workflow after all tasks have been successfully completed. In some embodiments, the workflow specification may override this through a specification of when the COMMIT message should be sent. The COMMIT message refers to the task to be committed through the Task-ID header. The receiver of the request may obtain a description of the task again by querying the workflow server with the Task-ID provided in the message. The proxy can send a COMMIT message to the workflow server to commit the workflow. This is an indication to the workflow server that the workflow execution was successful. The workflow server upon receipt of a COMMIT message will store the workflow instance for reference later and return a Workflow-ID. This Workflow-ID can be used to recreate services (in case of disaster recovery) or reverse them (in case of service deletion). Example COMMIT message:

```
From: default@p.provider.com
To: default@4357254.provider.com
Exchange: 43shXui7236
Via: SOP/1.0/UDP default@p.provider.com;branch=khewui6GDw
Sequence-ID: 134 COMMIT
Task-ID: 67439375
Workflow-Server: ws.provider.com
Requestor: consumer@customer.provider.com
```

In some embodiments, SOP defines a set of responses. SOP can use 1 xx-6xx responses:
1xx—Informational Responses
2xx—Successful Responses
3xx—Redirection Responses
4xx—Client Failure Responses
5xx—Server Failure Responses
6xx—Global Failure Responses In some embodiments, the 100 TRYING message can be sent by a proxy on receiving a workflow request. It can indicate that the proxy has received the request and is attempting to execute it. This message is sent by a receiving service node upon a CREATE, UPDATE, DELETE or TRANSFER request. This message informs the proxy that the request has been received and it being processed. Example of the 100 TRYING message:

```
From: default@p.provider.com
To: consumer@customer.com
Exchange: 43shXui7236
Via: SOP/1.0/UDP default@p.provider.com;branch=k9DjR5lbcw
Sequence-ID: 1 TRYING
Workflow-Name: gTyuI82Zx@provider.com
```

In some embodiments, a proxy may send a 183 WORKFLOW PROGRESS message periodically to a client keeping it informed about the update. This message may have a workflow description that describe the progress in execution. Example of the 183 WORKFLOW PROGRESS message:

```
From: default@p.provider.com
To: consumer@customer.com
Exchange: 43shXui7236
Via: SOP/1.0/UDP default@p.provider.com;branch=k9DjR5lbcw
Sequence-ID: 1 TRYING
Workflow-Name: gTyuI82Zx@provider.com
Content-Type: application/sdf; charset=utf-8
Content-Length: 542
<?xml version="1.0" encoding="UTF-8"?>
<workflow name="gTyuI82Zx" id="68743693"
    xmlns:sdf="http://sdf.org/sdf">
  <description>workflow description</description>
  <taskgroup id="1" prev="idle" next="idle">
    <description>taskgroup description</description>
    <task id="1" prev="idle" next="idle" action="CREATE"
        server="4357254.provider.com reference="67439375"
        status="pending"/>
  </taskgroup>
</workflow>
```

In some embodiments, a 200 OK message can be sent by multiple entities including a workflow server, a proxy, and a service node to indicate successful completion of the requests. Depending on the context, message contents and headers will vary. Below is an example message sent by a proxy on completion of a CREATE task:

```
From: default@4357254.provider.com
To: default@p.provider.com
Exchange: 43shXui7236
Via: SOP/1.0/UDP default@sn.provider.com;branch=k9DjR5lbcw
Sequence-ID: 134 CREATE
Task-ID: 67439375
Workflow-Server: ws.provider.com
```

In some embodiments, the 305 USE PROXY message is sent by a proxy if it wants to redirect the requestor to another proxy and will not service the request itself. The message includes the Alternate-Proxy header. Example 305 USE PROXY message:

```
From: default@p.provider.com
To: user@customer.com
Exchange: 43shXui7236
Via: SOP/1.0/UDP default@p1.provider.com;branch=k9DjR5lbcw
Sequence-ID: 1 WORKFLOW
Alternate-Proxy: default@p2.provider.com
Workflow-Name: gTyuI82Zx@provider.com
```

In some embodiments, the 400 BAD REQUEST message is sent by a proxy or a workflow server or a service node if they find a request malformed. Below is an example message:

```
From: default@p.provider.com
To: user@customer.com
Exchange: 43shXui7236
Via: SOP/1.0/UDP default@p1.provider.com;branch=k9DjR5lbcw
Sequence-ID: 1 WORKFLOW
Workflow-Name: gTyuI82Zx@provider.com
```

In some embodiments, the 403 FORBIDDEN message is sent by a proxy or a workflow server if they find the user is not authorized to perform an operation. This may be used by a proxy to indicate that a need to authenticate. The message may be used if a proxy or workflow server finds that a user is not authorized to execute a workflow. Example 403 FORBIDDEN message:

```
From: default@p.provider.com
To: user@customer.com
Exchange: 43shXui7236
Via: SOP/1.0/UDP default@p1.provider.com;branch=k9DjR5lbcw
Sequence-ID: 1 WORKFLOW
Workflow-Name: gTyuI82Zx@provider.com
```

In some embodiments, the 500 SERVER INTERNAL ERROR message is sent by a proxy or a workflow server or a service node if they tried to process a request but failed due to some internal error. A service node may send this request if it fails to perform a requested operation (e.g., service creation, deletion, or update). Example 500 SERVER INTERNAL ERROR message:

```
From: default@p.provider.com
To: user@customer.com
Exchange: 43shXui7236
Via: SOP/1.0/UDP default@p1.provider.com;branch=k9DjR5lbcw
Sequence-ID: 1 WORKFLOW
Workflow-Name: gTyuI82Zx@provider.com
```

In some embodiments, the 504 SERVER TIMEOUT message is sent by a proxy if one of the service nodes fails to respond to a request, and the proxy times out on retransmits. Example 504 SERVER TIMEOUT message:

```
From: default@p.provider.com
To: user@customer.com
Exchange: 43shXui7236
Via: SOP/1.0/UDP default@p1.provider.com;branch=k9DjR5lbcw
Sequence-ID: 1 WORKFLOW
Workflow-Name: gTyuI82Zx@provider.com
```

In some embodiments, the 603 DECLINE message is sent by a proxy, workflow server, or service node if it is not able to support the request, because there is no capacity available. This response can be sent if the proxy knows that no other proxy will be able to support this request (otherwise a 305 USE PROXY may be sent). The scope of the DECLINE message is the set of proxies that the proxy sending the message is aware of. Example 603 DECLINE message:

```
From: default@p.provider.com
To: user@customer.com
Exchange: 43shXui7236
Via: SOP/1.0/UDP default@p1.provider.com;branch=k9DjR5lbcw
Sequence-ID: 1 WORKFLOW
Workflow-Name: gTyuI82Zx@provider.com
```

In some embodiments, SOP can use UDP or TCP transports. Service management creates, deletes, configures and moves services. It is beneficial to have these transactions be highly reliable and scalable. SOP has built in timers to COMMIT/CANCEL procedures to deal with network reliability issues, e.g., in case the proxy fails or the connection to the proxy fails. As such, SOP can work with the use of either TCP or UDP. The choice of transport therefore may depend on the desired scale and reliability of deployment. Limitations of transport may also be overcome through additional means. For example, it is possible to deploy a set of TCP proxies that offloads TCP scale outside the SOP proxy. As another example, UDP transport can be used in combination with shorter retransmit timers and increased retransmit counters. SOP can dynamically distribute timer and counter values across the network.

In some embodiments, headers 220 have source and destination names. A request may traverse through proxies and which may keep track of the request paths and correlate them with response paths using the source and destination names. Headers 220 may also include transaction identifiers that may be used to correlate requests with responses. Headers 220 may include sequence numbers that may be used to identify the order of message transmission. Fields to define content type and content length may also be included in headers 220.

In some embodiments, entities in SOP can be addressed by a user@domain name. The user "default" can be used in the following circumstances:
  for addressing proxies and workflow servers;
  for addressing a service when it does not have a name assigned (e.g., prior to a service node registers);

for addressing entities in a broadcast message;
if a sender does not know which user should be addressed;

Headers included in packet 200, in various embodiments, may be defined to suit various goals. The following is a list of example headers:

Acknowledge Timeout—this header indicates the time in seconds after which a service node may send a "reminder" 200 OK message to a proxy soliciting a COMMIT. After Retransmission Counter times transmissions of the 200 OK message, the service node may consider the transaction cancelled and initiate rollback operations. This header can be sent in the ADVERTISE message to set the global value of the timeout. The header may be sent in the CREATE, DELETE, TRANSFER requests to set the timeout depending on the time a proxy anticipates it would take to complete certain operations. Example: Acknowledge-Timeout: 30

Alternate Proxy Header—This header can be used to redirect a client to another proxy. This can happen, for example, if a proxy knows that the workflow anchor for the workflow has moved to another proxy and the proxy is configured not to forward requests to that proxy. Example: Alternate-Proxy: p2.provider.com Cancel Timeout Header—This header indicates the time in seconds after which a proxy can send a cancellation for a request if a 200 OK or 100 Trying message has not been received. This header can be sent in an ADVERTISE message to set the global value of the timeout. The header may also be sent in the CREATE, DELETE, TRANSFER or UPDATE requests to set the timeout per request basis. Example: Cancel-Timeout: 30

Commit Timeout Header—This header defines the time in seconds after a response has been sent that a COMMIT message is expected by the service node. Example: Commit-Timeout: 50

Content Type Header—This header defines the kind of content carried in the SOP request. SOP messages are expected to carry SDF payloads (e.g., in attributes 230 and service descriptors 240). However, it is possible that other kinds of service description schemes may be used in conjunction with SOP. This header may be used to specify the type of application payload carried in the SOP message. Example: Content-Type: application/sdf; charset=utf-8

Content Length Header—This header defines length of content carried in the SOP request, computed in bytes. The length may not include SOP headers. It may be the length of the SDF payload carried in the SOP packet. Example: Content-Length: 158

Distance Header—This header helps in identifying the distance of a network entity from a receiver. It can be used in PUBLISH messages to advertise services. The value of this header is incremented whenever a PUBLISH message is forwarded. The receivers can use a shortest path to a service, and to avoid service routing loops. Example: Distance: 1

Destination Header—This header may be present in the TRANSFER messages. It is used to indicate the address of the destination service node that will be receiving a service. Example: Destination: default@sn.provider.com Exchange Header—This header is used to identify the exchange within which a transaction is taking place. The use of exchange identifiers helps to correlate cross-domain, multi-device or other complex service management that may involve multiple devices or multiple service providers. This header can be present in request-response messages. Example: Exchange: 43shXui7236

From Header—This header identifies the originator of a service request. It can indicate the initiator's address. Example: From: default@p.provider.com Node Type Header—This header identifies the type of node in the SOP network. The header may have one of the following values: (a) "service-client", (b) "workflow-server", (c) "service-proxy" and (d) "service-node". This header is used in REGISTER, PUBLISH and SUBSCRIBE messages. In the REGISTER and PUBLISH messages it helps to identify the sender type and distinguish various types of registrations or publications. In the SUBSCRIBE message it helps the proxy to determine which node's information must be forwarded to the requestor. Example: Node-Type: service-node Priority Header—This header may be added by requestor to prioritize its processing over other pending messages. Priorities can be any number from 1 to 65535, with 65535 being the highest. This field may be used in conjunction with policy decisions in a cloud service network to prioritize certain requests over others. Example: Priority: 5

Query Type Header—This header can be used in GET requests to obtain information about a Task-ID, Workflow-Name, Workflow-ID, List of Workflow-IDs against a Workflow-Name, or List of Task-IDs against a Workflow-ID or Name. The header can have the following values:

(a) "active-workflows"—all workflow-ids against a workflow-name. The Workflow-Name can be present in the request.

(b) "active-tasks"—all task-ids for a Workflow-Name or Workflow-ID. The Workflow-Name and/or Workflow-ID can be present in request.

(c) "workflow-name"—description of a Workflow in Tasks, specified by a Workflow-Name. The Workflow-Name can be present in the request.

(d) "workflow-id"—description of tasks that were performed in a particular instance of a Workflow, denoted by the Workflow-ID. The Workflow-ID can be present in the request.

(e) "task-id"—description of the attributes that make up a specific task referenced by the Task-ID. The Task-ID can be present in the request. Workflow-Name and Workflow-ID can be present.

Example: Query-Type: workflow-id

Publish Timeout Header—This timer indicates the period at which a service node can publish its services to a proxy regardless of change in service availability. Example: Publish-Timeout: 500

Retry Count Header—This header defines the number of times a service node can send a 200 OK message in response to a CREATE, DELETE, TRANSFER or UPDATE messages before receiving a COMMIT message. On each retry, the Commit-Timeout may be expired before the retry is attempted. After completion of Retry Count number of retries, the service node can initiate a service rollback. This header is sent in the ADVERTISE message and may be sent in individual CREATE, DELETE, TRANSFER or UPDATE messages. In the latter case, the count applies only to that particular Exchange. Example: Retry-Count: 3

Requestor Header—In some embodiments, the originator of a request may be different than the requestor. For example, a proxy may initiate a request using a trigger not included in the SOP protocol. It is helpful to include requestor's information in SOP messages. This information may be used for accounting, or other user-specific customizations. This header can the same as or similar to the From Header. Example: Requestor: service-client@customer.com Registration Timeout Header—This header indicates to a service node the time within which it must register again. Example: Registration-Timeout: 10000

Service ID Header—A Service ID may be used to refer to a particular instance of a virtual service. A proxy can return a unique Service ID in response to a REGISTER message. That ID can be used in future to identify services. A new Service ID can also be indicated by the workflow server in case of a new service creation. Moving services can retain the Service-ID. Example: Service-ID: 8743435@compute; Service-ID: 8743435@compute-resources.provider.com.

Sequence ID Header—This header is present in requests and identifies the sequence number of requests of the same type. By adding sequence numbers, a receiver has the ability to identify which requests have come later. The sequence numbers are reset after they have reached a maximum, as an example, of a 32-bit unsigned integer. Example: Sequence-ID: 8624 CREATE Source Header—This header is used for service mobility and indicates the address of the source service node that will be transferring a service. Example: Source: default@sn.provider.com Subscribe Timeout Header—This timer indicates the period at which a node must send a SUBSCRIBE message for service nodes or clients regardless of change in their availability. Example: Subscribe-Timeout: 500

Task ID Header—This header identifies a unique type of configuration in the TS. A common ID may be used across a number of service nodes. Configuration specific to a service node can be passed based on the requestor's address in a GET message. Use of an ID allows configurations to be stored centrally. Example: Task-ID: 67439375

Timestamp Header—This header may be added by a requestor to identify the time of the request origination. It may be used to drop requests that are older than the specified expiry time period. The timestamp, for example, will specify the expired seconds according to UTC since Jan. 1, 1961. Example: Timestamp: 1285162130

To Header—This header identifies the destination of the service request. It can indicate an identifier to which the service request is targeted. Example: default@p.provider.com Transfer Mode Header—This header is used in the REGISTER message. The service node identifies the manner in which it can support service mobility. If the service node is capable of transferring live state to another service node, it sets this header to "stateful". If the service node cannot transfer live state, it sets this header value to "stateless". In stateless transfers, a service instance is created and the old one is deleted. Example: Transfer-Mode: stateful Via Header—This header can be inserted by nodes using SOP through which a request traverses, provided that the node is not acting as a stateless proxy. The forwarder inserts its SOP address and a random "branch" parameter to identify the transaction between peering entities. The header will also have the SOP version and indicate the transport over which SOP message is transmitted. Example: Via: SOP/1.0/UDP default@sb.provider.com;branch=k9DjR51bcw Workflow ID Header—This header identifies a unique instance of a workflow. A workflow may be customized for a user based on user-specific policies. The Workflow ID is the specific customized instance of a workflow. It may reference a stored workflow in the workflow server, or with a suitable number of parameters so as to compute the workflow at a later time. Example: Workflow-ID: 68743693@provider.com Workflow Name Header—This header identifies a unique workflow within a service provider. The Workflow Name allows a client or proxy to request a workflow execution. A proxy sends PUBLISH messages listing available workflows. Workflow Name identifies the service provider who supports the workflow. This allows workflow names to overlap across providers. Example: Workflow-Name: X32nmTrUwq@provider.com Workflow Server Header—This header provides the address of a workflow server that a service node or proxy may query for processing a request, such as to obtain a task description. This header can be used in conjunction with the Task-ID header. Example: Workflow-Server: Workflow-Server.provider.com In some embodiments, service nodes may be addressed by a name such as service@sn.provider.com, where "sn" is a service node and "service" is a virtual service instance at the service node. If there is one service node for many virtualized service instances, the service node can receive all messages for virtualized service instances, even though they are addressed to a particular "service". The service node may take actions on a request on behalf of the service or pass on information to the service. When messages are being broadcast, an address of the type default@default.provider.com may be used, and the packet will use a broadcast IP address.

In some embodiments, one or more of the following timers and/or counters can be used by proxies (e.g., proxies 112, 118, and 142) in implementing a common protocol for managing services:

Retransmission Counter—This counter defines the number of retransmissions for a request before a CANCEL message is sent, or for a response before a COMMIT message is expected. The value of the counter is set by the Retry-Count header globally in the ADVERTISE message or per transaction in CREATE, DELETE, TRANSFER or UPDATE messages.

Acknowledge-Timeout—This indicates the time after which a service node may send a "reminder" 200 OK message to a proxy, soliciting a COMMIT message. After a certain number of retries of the 200 OK message (e.g., specified by the Retransmission Counter), the service node would consider the transaction cancelled and initiate rollback operations.

Register-Timeout—This indicates the maximum time for which a proxy will accept a registration. The service node registers with the proxy within that time. If a REGISTER message is not received before this time expires, the proxy marks the service node and its services unavailable. On receiving a REGISTER message that matches its Capabilities, the proxy sends a 200 OK message.

Advertise-Timeout—This indicates the time after which a Proxy will send an ADVERTISE message. If the proxy indicates that the time period for the ADVERTISE message has expired three times successively, a service node may transmit a DISCOVER message requesting proxies that can facilitate its service domains. This timer is set by the Advertisement-Timeout header in the ADVERTISE message.

Cancel-Timeout—This timer is started after sending any request and reset after the receipt of any provisional or final response (such as 100 Trying or 200 OK messages). If a provisional or final response is not received, the sender transmits the request a certain number of times as specified, for example, in the Retransmission Counter. If a provisional or final response is still not received, the sender sends a CANCEL message and will terminate the transaction. This timer is set by the Cancel-Timeout header in the ADVERTISE message and it may be overridden on per transaction basis in the CREATE, DELETE, TRANSFER and UPDATE messages.

Commit-Timeout—This timer will be started by a responder after sending a 200 OK message on transactions where a COMMIT message is expected (e.g., CREATE, DELETE, and TRANSFER messages). After the timer expires, a 200 OK message will be retransmitted up to a maximum number of times as specified by the Retransmission Counter. When the Commit-Timeout has expired that number of times (after sending a 200 OK message) the responder silently discards (or rolls back) the changes it had performed earlier. This timer is set by the Commit-Timeout header in the ADVERTISE message and it may be overridden on per transaction basis in the CREATE, DELETE, TRANSFER and UPDATE messages.

Discover-Timeout—This timer will be started by a service node immediately after startup or after three successive timeouts of the Advertise-Timer (i.e., the proxy has not sent an ADVERTISE message after three successive timeouts). When the Timer expires, the service node transmits the DISCOVER message. The timer is reset upon receipt of a ADVERTISE message that matches the service node's service domain. This time has a fixed value of fifteen seconds, because the timer is required to discover a proxy and prior to receiving an ADVERTISE message.

Publish-Timeout—This timer defines the time period within which a service node must send its service updates, regardless of any change in the service status. This will refresh a proxy's service database, and prevent stale information. This timer is set in the ADVERTISE message. Example: Publish-Timeout: 500

Subscribe-Timeout—This timer defines the time period within which a node must send a SUBSCRIBE message requesting for updates on a service node's or a client's availabilities. This will refresh a proxy's subscribe database, and prevent stale information. This timer is set in the ADVERTISE message. Example: Subscribe-Timeout: 5000

Retransmit-Timeout—This timer defines the time period within which a node must send a 100 TRYING response to acknowledge a request. If the 100 TRYING response is not received within this time, the sender retransmits the request up to a specified maximum number of times. This timer is set in the ADVERTISE message. Example: Subscribe-Timeout:

In some embodiments, attributes 230 and service descriptors 240 may include information regarding names of services, service classes, syntax for properties of service classes, semantics in a service class, bundles of multiple service classes into a single workflow, and description of tasks and workflows.

Service descriptors 240 may include XML schemas. For example, an XML scheme may be included for a "hub" in a domain named "iaas.network" would be:

```
<?xml version="1.0" ?>
    <domain name="iaas.network" type="capability" def="sdn">
        <d1:hub xmlns:xsi="http://www.w3.org/2001/XMLSchema-
        instance"
        xmlns:d1="http://sdf.org/iaas.compute"
        xsi:schemaLocation="http://sdf.org iaas.compute.xsd">
            <d1:interface>
                <d1:intf-type>Ethernet</d1:intf-type>
                <d1:module>1</d1:module>
                <d1:intf-name>1</d1:intf-name>
            </d1:interface>
            <d1:interface>
                <d1:intf-type>Ethernet</d1:intf-type>
                <d1:module>1</d1:module>
                <d1:intf-name>2</d1:intf-name>
            </d1:interface>
        </d1:hub>
    </domain>
```

As another example, an XML scheme may be included for a "router" in a domain named "iaas.network" and adds "ip-address" and "subnet-mask" elements would be:

```
<?xml version="1.0" ?>
<domain name="iaas.network.routing" type="capability" def="sdn">
    <d1:router xmlns:xsi="http://www.w3.org/2001/XMLSchema-instance"
    xmlns:d1="http://sdf.org/iaas.compute.routing"
    xsi:schemaLocation="http://sdf.org iaas.compute.routing.xsd">
        <d1:interface>
            <d1:intf-type>Ethernet</d1:intf-type>
            <d1:module>1</d1:module>
            <d1:intf-name>1</d1:intf-name>
            <d1:ip-address>10.10.10.1</d1:ip-address>
            <d1:subnet-mask>255.255.255.0</d1:subnet-mask>
        </d1:interface>
        <d1:interface>
            <d1:intf-type>Ethernet</d1:intf-type>
            <d1:module>1</d1:module>
            <d1:intf-name>2</d1:intf-name>
            <d1:ip-address>10.10.10.2</d1:ip-address>
            <d1:subnet-mask>255.255.255.0</d1:subnet-mask>
        </d1:interface>
    </d1:router>
</domain>
```

The <domain> XML element is used to encapsulate the domain-specific service description that the receiver can interpret. This element has the following attributes:

A Domain Name Attribute—this is the service name for payload contained within the <domain> tag. It helps the receiver identify the service name and determine if the receiver knows how to deal with the payload;

A Type Attribute—this has two possible values: "capability" and "availability". The "capability" attribute is used in requesting actions by the receiver. The "availability" attribute is used by the service to advertise its service availabilities. With virtualized services, the availability reduces as services are allocated to users, although the capability remains unchanged. The capability would however change in case of partial or total service failures, such as software or hardware failures;

The Def Attribute—this allows standard and non-standard payloads to be sent in the same manner. For standard domains, the attribute has the value "sdn" and for non-standard domains the attribute is set to "vsd".

The example domain scheme described here can be used in conjunction with existing standard or non-standard service definitions. For example, the domain scheme may be used in conjunction with an existing specification such as Open Virtualization Format (OVF) described at http://xml-.coverpages.org/DMTF-OVF-v10-DSP0243.pdf. The OVF scheme will need to be identified by a domain name, such as iaas.compute.virtual. This is shown below.

```
<domain name="iaas.compute.virtual" type="capability" def="sdn">
    <!-- list of OVF elements and attributes -->
</domain>
```

In some embodiments, there may be a need for vendors to deliver service customizations that are non-standard. Such services may be defined in the same or similar manner as standard service definitions. To indicate that it is a vendor specific domain (and may not be understood by every network element), a domain may be (a) given a name that does not overlap with standard domain names, and (b) identified by the def="vsd" attribute in the <domain> element. For example, a "vendor" may define their private domain "vendor.router" and this domain would be referred to as follows.

```
<domain name="vendor.router" type="capability" def="vsd">
    <!-- list of vendor-specific elements and attributes -->
</domain>
```

In some embodiments, vendor defined domains may begin with the vendor's name. Vendor specific domains (VSDs) may be treated differently in how they are used across boundaries. For example, a vendor might advertise a VSD to selected customers.

In some embodiments, XML schemas associated with service domains define elements, their attributes and the syntax for describing elements and attributes. Domain semantics may be used to describe the relation between attributes within and across service domains. The described relations may indicate how resources (logical, virtual or physical) are allocated to populate elements and attributes in XML documents. For example, the MAC address assigned to a virtual machine may be unique amongst hosts that the virtual machine is going to interact with. This uniqueness is a relation between the various MAC addresses. Continuing the example, the MAC address of the virtual machine may also be in access-lists on the network. This is a relation between the compute and network domains. As another example, network based storage may be mapped to file systems on a host, requiring a mapping of logical and virtual resources across compute and storage domains. To restrict access to the storage to certain hosts, there may be a relation between host, network and storage domains. Relations between attributes within and across domains constrain resource allocation. When resources are allocated according to these constraints, services created across different domains work together with little to no conflict. Domain semantics is the relation between attributes within a domain and across domains.

One manner to express the relations between attributes is using a high-level language such as XML. For example, XML technologies such as Object Constraint Language and SCHEMATRON can be used to describe semantic relations. An example constraint is shown below where a virtual local area network (VLAN) configured on a virtual machine interface is equal to the VLAN access allowed on the network switch.

/iaas.network.switching/port-list[0]/acl@vlan=
/iaas.compute.virtual/vm-list[0]/interface-list[0]/vlan In some embodiments, semantic rules that specify relations between domain attributes may be defined in separate Domain Semantics Rules (DSR) files. Each DSR file may be associated with a workflow. Similar to hierarchical domain specifications, it is also possible to define parent and child DSR files. Specification of semantics through DSR files may provide for a service to be rapidly customized and for new services to be created. A reusable hierarchy of DSR files may be defined to facilitate service relations across domains.

In some embodiments, service descriptors 240 may include identifiers for tasks and/or workflows.

An example XML schema that includes information included in attributes 230 and service descriptor 240 follows:

```
<xs:schema xmlns:xs="http://www.w3.org/2001/XMLSchema"
    targetNamespace="http://sdf.org"
    xmlns="http://sdf.org" elementFormDefault="qualified">
    <xs:element name="domain" type="xs:string">
        <xs:attribute name="name" type="xs:string"/>
        <xs:attribute name="def">
            <xs:simpleType>
                <xs:restriction base="xs:string">
                    <xs:enumeration value="sdn"/>
                    <xs:enumeration value="vsd"/>
                </xs:restriction>
            </xs:simpleType>
        </xs:attribute>
        <xs:attribute name="type">
            <xs:simpleType>
                <xs:restriction base="xs:string">
                    <xs:enumeration value="capability"/>
                    <xs:enumeration value="availability"/>
                </xs:restriction>
            </xs:simpleType>
        </xs:attribute>
    </xs:element>
    <xs:element name="workflow" >
        <xs:attribute name="name" type="xs:string" use="required"/>
        <xs:attribute name="anchor" type="xs:string"/>
        <xs:attribute name="id" type="xs:string"/>
        <xs:attribute name="distance" type="xs:integer"/>
        <xs:complexType>
            <xs:element name="description" type="xs:string"/>
            <xs:element name="taskgroup" maxOccurs="unbounded">
                <xs:attribute name="id" type="xs:string"/>
                <xs:attribute name="prev" type="xs:string"/>
                <xs:attribute name="next" type="xs:string"/>
                <xs:complexType>
                    <xs:element name="description" type="xs:string"/>
                    <xs:element name="task" maxOccurs="unbounded">
                        <xs:attribute name="id" type="xs:string"/>
                        <xs:attribute name="prev" type="xs:string"/>
                        <xs:attribute name="next" type="xs:string"/>
                        <xs:attribute name="server" type="xs:string"/>
                        <xs:attribute name="status" type="xs:string">
                            <xs:simpleType>
                                <xs:restriction base="xs:string">
                                    <xs:enumeration value="pending"/>
                                    <xs:enumeration value="complete"/>
                                </xs:restriction>
                            </xs:simpleType>
                        </xs:attribute>
                        <xs:attribute name="reference" type="xs:integer"/>
                        <xs:attribute name="action">
                            <xs:simpleType>
                                <xs:restriction base="xs:string">
                                    <xs:enumeration value="CREATE"/>
                                    <xs:enumeration value="DELETE"/>
                                    <xs:enumeration value="TRANSFER"/>
```

```
            <xs:enumeration value="GET"/>
            <xs:enumeration value="UPDATE"/>
            <xs:enumeration value="WORKFLOW"/>
            <xs:enumeration value="COMMIT"/>
            <xs:enumeration value="CANCEL"/>
          </xs:restriction>
        </xs:simpleType>
      </xs:attribute>
      <xs:element type="domain"/>
      </xs:element>
    </xs:complexType>
  </xs:element>
  </xs:complexType>
</xs:element>
</xs:schema>
```

In some embodiments, packet 200 may illustrate a manner in which attributes 230 and descriptors 240 separate a set of domain specific meta-attributes and vendor specific service descriptions. The meta-attributes include things like service type (e.g. compute, network, storage, firewall, load-balancer, application, and other suitable services), vendor, software and hardware versions, domain specific attribute parameters or attributes (such as attributes specific to Communication as a Service, Network as a Service, Storage as a Service, Software as a Service or other suitable services). The meta-attributes can also identify the type of format used for the vendor specific service description. These meta-attributes can be understood by one or more proxies (e.g., proxies 112, 118, or 142) because there is need for a minimal connection between the service description and the management provided by proxies. The meta-attributes may help a proxy aggregate service types logically, which is essential to select the appropriate kind of resource for service creation. Once the meta-attributes have been standardized, the service description data can be non-standard, vendor-specific, or otherwise suitably configured. Using this separation, any kind of service description may be transparently communicated through a proxy. Some of these descriptions could be standardized and others proprietary. Service descriptions can carry command-line interface commands, XML packets, text-based or binary formatted documents. The proxy may not need to know what is inside a service description other than the meta-attributes. The domain-specific meta-attributes can be borrowed or developed by different standards organizations that are standardizing different kinds of network-based services (e.g., cloud services).

In some embodiments, a proxy can obtain the combination of proprietary and standard descriptions from a policy server and pass them to a hardware or software entity transparently. This may enable the possibility that such an entity can be upgraded and enable a transparent use of new features with the same proxy. The attributes to such an entity can change the vendor-specific attributes while preserving the domain-specific attributes. Domain-specific proxies can be developed which specialize in a particular kind of cloud orchestration, using the proposed separation between metadata and data. The mechanism can also be used to create multi-vendor and multi-product service management that span across several different service domains.

Figure 3:
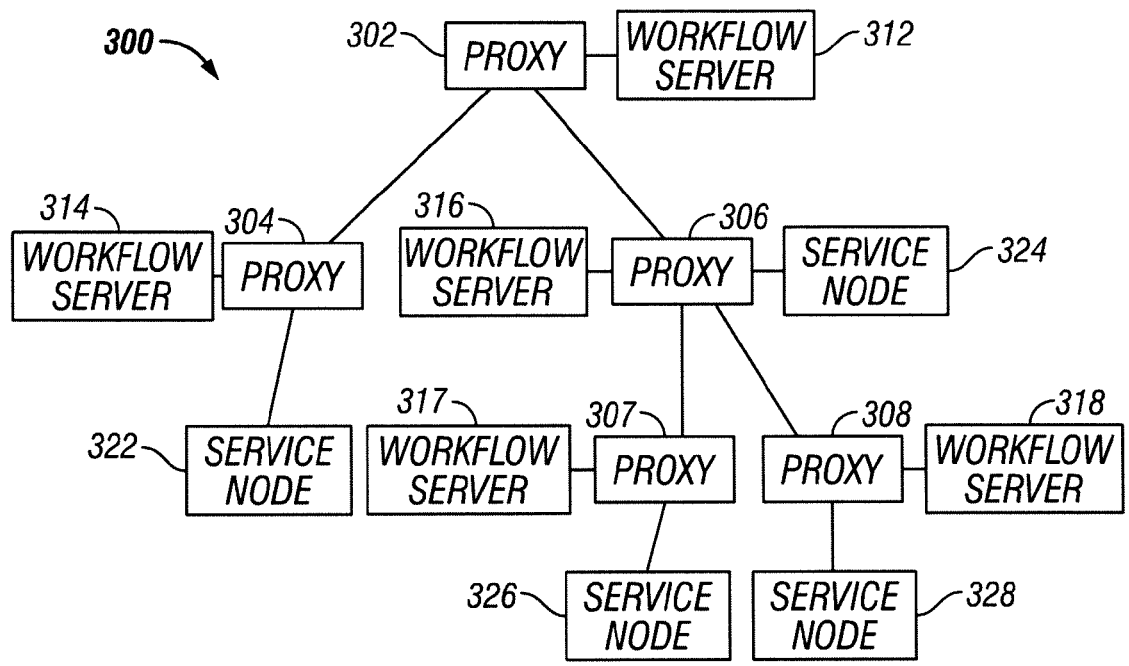
FIG. 3 illustrates one embodiment of system 300 that is capable of branching a workflow.

FIG. 3 illustrates one embodiment of system 300 that is capable of branching a workflow. System 300 includes proxies 302, 304, 306, 307, and 308. Workflow nodes 312, 314, 316, 317, and 318 are associated with and coupled to proxies 302, 304, 306, 307, and 308, respectively. Service nodes 322, 324, 326, and 328 are associated with and coupled to proxies 304, 306, 307, and 308, respectively. In system 300, a workflow received by proxy 302 may have its tasks performed by service nodes 322, 324, 326, and 328 using branching. This may be facilitated by proxies 304, 306, 307, and 308 and workflow nodes 314, 316, 317, and 318. A scheme for defining the ordering tasks may use an XML schema and may conform to a language, such as a Service Workflow Description Language (SWDL).

Information stored in storage of nodes in system 300 may be implemented using any suitable structure for storing and retrieving information. Databases, file systems, tables, lists, or suitable combinations of these structures are examples of how such information may be stored. Computer-readable non-transitory storage media may be used such as: a semi-conductor-based or other integrated circuit (IC) (e.g., a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, another suitable medium, or a suitable combination of these, where appropriate. A computer-readable non-transitory storage medium may be volatile, non-volatile, or a combination of volatile and non-volatile, where appropriate.

When a workflow spans across multiple service nodes (e.g., compute, storage, network, security, and/or software), there may be a location (e.g., proxy 302 and workflow node 312) where the workflow is broken into individual tasks for execution. Branching a workflow involves allocating tasks to different service nodes. In some embodiments, the location (e.g., proxy 302 and workflow node 312) in the network where the workflow is decomposed into tasks may be referred to as the workflow anchor. The component tasks in a workflow are determined by the workflow node at the workflow anchor (e.g., workflow node 312). These tasks may be initiated by a proxy (e.g., proxy 302) at the workflow anchor.

In some embodiments, a flowchart may be created using tasks, task groups, and workflows, by labeling individual items in the workflow and ordering the items using, for example, "prev" and "next" tags. Each workflow may have an associated workflow anchor. The following XML is an example implementation of a workflow:

```
<workflow name="X32mnTrUwq" id="k9DjR5lbcw"
    xmlns:sdf="http://sdf.org/sdf" anchor="p.provider.com">
  <description>workflow description</description>
  <taskgroup id="1" prev="idle" next="idle">
    <description>taskgroup description</description>
    <task id="1" prev="idle" next="idle"
        server="4357254.provider.com" type="CREATE">
      <domain name="..." type="capability">
        <!-- list of domain attributes -->
      </domain>
    </task>
  </taskgroup>
</workflow>
```

The "type" of each task may map to one of the messages used by a proxy of system 100. The "server" attribute defines the service entity that will process the task or workflow. The "server" could be a service node (e.g., service node 132), a proxy (e.g., proxy 142), or a workflow server (e.g., workflow server 152). The "instance" attribute in the workflow may be an exchange value that represents one instance of an executing workflow.

In some embodiments, a WORKFLOW message is used by proxies implementing SOP to perform the functionality discussed above regarding workflows. The WORKFLOW message may contain the workflow name being requested. The request may also contain a complete or partial workflow description. All network elements prior to a workflow anchor may forward the WORKFLOW message request without branching it into tasks. When receiving the WORKFLOW message, the workflow anchor extracts the workflow and sends it to the relevant workflow servers along with the workflow name using the GET message. This requests that the workflow server validate and complete the workflow specification. The workflow in the GET request serves as input to the workflow server to construct a complete workflow specification. The workflow server may override the workflow description or may reject the GET request using, for example, configured policies. If the workflow has been accepted, the complete workflow specification can specify individual tasks such as CREATE, DELETE, TRANSFER, COMMIT, or other suitable tasks that the workflow anchor can execute. On receiving a completed workflow specification, the workflow anchor can proceed to executing the workflow. If the workflow has been rejected, the workflow anchor can forward a rejection indication to the upstream network element.

In some embodiments, the WORKFLOW message allows service bundles to be treated as atomic services for upstream network elements. A customer or provider can create a workflow description and use a PUBLISH message to send it through the service network using a unique service name. Users or service providers can request this service through the WORKFLOW message. By anchoring the workflow in a particular location, the correct execution of the workflow can be guaranteed. The workflow anchor ensures that the workflow is validated and authorized prior to execution and accounted after completion.

In some embodiments, a workflow anchor is helpful because once a workflow has been branched into tasks, other downstream entities receiving such tasks (e.g., proxies 304, 306, 307, and 308) do not have the entire workflow and so they cannot manage the workflow as a whole. The workflow anchor (e.g., proxy 302 and workflow node 312) manages the workflow. It is responsible for (a) executing the right tasks, (b) executing these tasks in the correct order, (c) correctly accounting for tasks after execution, and (d) handling failures in the right way when they arise, among other responsibilities.

In some embodiments, network elements that are upstream from the anchor location may not be able to branch the workflow into tasks. These elements may validate the workflow but they are not responsible for doing so. The nodes including in the anchor location may be responsible for validating the workflow and correct execution. There may be an interface through which proxies and clients can request complete workflows.

In some embodiments, a workflow request received at a proxy (e.g., proxy 302) at the anchor location may be incomplete. The request may specify parameters about a virtual machine, and may leave the details of network, storage and security to the anchor location, for example. Such a request may be forwarded to an associated workflow node (e.g., workflow node 312) to obtain a complete and accurate description of the workflow prior to executing it.

The workflow anchor can be located at multiple points in the network, such as at a customer location or a service provider location. For example, the workflow anchor may be at a client of services and the client will have to manage the workflow execution, service accounting, and failure handling. In such an example, customer proxies and service provider proxies (e.g., proxies 304 and 306) may inspect or authenticate the messages in transit but they may not have knowledge of the complete sequence of tasks and will not be able to validate if the workflow anchor is executing the right sequence of tasks.

In some embodiments, the workflow may be anchored using a customer's proxy or a service provider's proxy. A client would then request workflow execution from one of these proxies. The client may refer to the workflow through some workflow name in order for the receiving proxy to validate if the request is correctly formed. Execution of the workflow would be managed by the proxy of the customer or service provider while the client may still know the workflow composition and can frame the workflow request. The proxy serving as a workflow anchor will validate the workflow before branching tasks. The proxy may ensure accounting and failure handling.

Depending on the deployment scenario, the workflow anchor may be situated at various points in the network. For personal clouds, as an example, a client may be a valid anchor location. For private enterprise clouds, as another example, a customer's proxy may be a valid anchor location. For public clouds, a service provider's proxy may be a valid anchor location. For community clouds, a service node may be a valid anchor location.

An example application of system 300 involves a situation where a customer creates a complex service by combining workflows in a private cloud and a public cloud through a single request. Another example involves a service provider creating services in its network and another service provider's network through the same request. As another example, a single request may be managed by multiple domain-specific proxies (e.g., proxies 307 and 308) within a provider's network. To distribute workflows across service domains and provider/customer boundaries, a large workflow may be decomposed into individual workflows owned by individual proxies.

As an example operation, proxy 302 may receive a two-stage workflow called MN (M and N are two stages) and may forward the two stages to proxies 304 and 306. Proxy 304 may execute workflow M using service node 322. Proxy 306 may divide workflow N into workflows X, Y and Z. Proxy 306 may execute workflow X using service node 324. Proxy 306 may delegate workflows Y and Z to proxies 307 and 308, respectively. Proxy 307 may execute workflow Y using service node 326 and proxy 308 may execute workflow Z using service node 328.

In some embodiments, the implementation of a workflow may be changed while keeping the interface to it unchanged. The mapping between workflows and their branching patterns may also be changed. This may give operators flexibility in deploying services.

FIGS. 5-10 illustrate example message flows used in system 100 of FIG. 1 and packet 200 of FIG. 2. The steps discussed FIGS. 5-10 may be repeated as necessary to manage services. Particular embodiments may repeat the steps of FIGS. 5-10, where appropriate. Moreover, although this disclosure describes and illustrates particular steps in FIGS. 5-10 as occurring in a particular order, this disclosure contemplates any suitable steps in FIGS. 5-10 occurring in any suitable order. Furthermore, although this disclosure describes and illustrates particular components, devices, or systems carrying out particular steps in FIGS. 5-10, this disclosure contemplates any suitable combination of any suitable components, devices, or systems carrying out any suitable steps in FIGS. 5-10.

Figure 5:
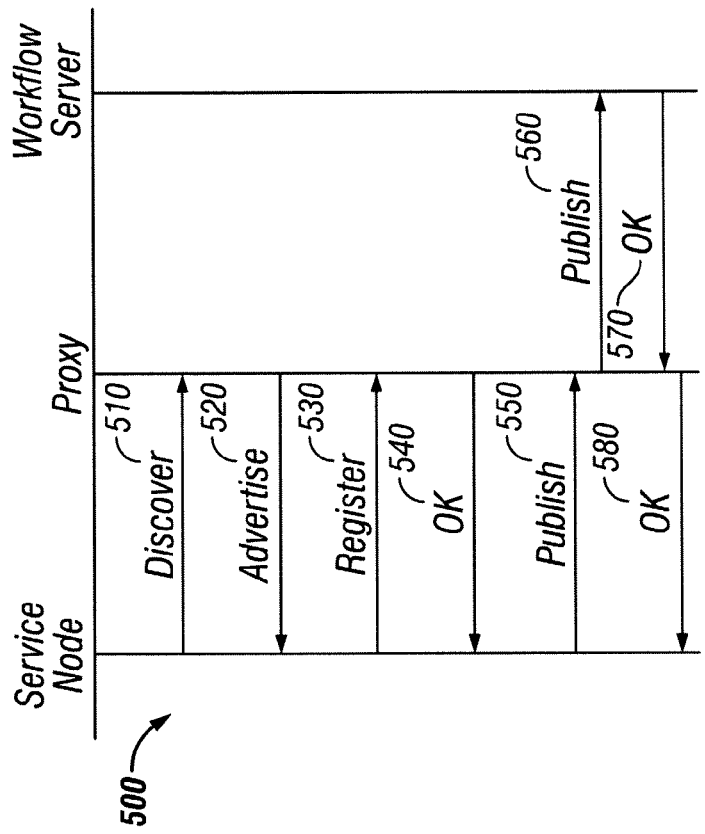
FIG. 5 illustrates a message flow for discovering a service node.

FIG. 5 illustrates a message flow for discovering a service node. At step 510, in some embodiments, on initialization, a service node will send out a DISCOVER message asking for a proxy to which it can send service information. The DISCOVER message carries the service domains that the service node supports. A proxy will respond only for service domain names that it is configured to proxy. This may allow for multiple kinds of service domain specific proxies to exist in a network, managing specific kinds of services. An example of the DISCOVER message used at step 510 follows:

```
DISCOVER 1 SOP/1.0
From: default@default.com
Via: SOP/1.0/UDP default@default.com;branch=k9DjR5lbcw
Timestamp: 1285162130
Sequence-ID: 1 DISCOVER
Content-Type: application/sdf; charset=utf-8
Content-Length: 100
    <?xml version="1.0" encoding="UTF-8"?>
    <domain name="iaas.compute" type="capability" def="sdn"/>
```

In this example message, the service node supports the iaas.compute domain. It sends the DISCOVER message to find proxies that may manage service for this domain.

At step 520, in some embodiments, the proxy sends an ADVERTISE message indicating its presence and readiness to proxy for certain service domains. This may be sent on initialization, on the receipt of a DISCOVER message, or on the expiration of the Advertise-Timeout, whichever comes earlier. The ADVERTISE message will be sent as a unicast if sent to a specific service node after receiving a DISCOVER message from it. Otherwise, the proxy will broadcast the DISCOVER message to all service nodes in the network. The ADVERTISE message indicates service domain names so that service nodes with those capabilities need recognize it. An example of the message sent at this step follows:

```
ADVERTISE 1 SOP/1.0
From: default@p.provider.com
To: default@default.provider.com
Exchange: 43shXui7236
Via: SOP/1.0/UDP default@p.provider.com;branch=k9DjR5lbcw
Timestamp: 1285162132
Sequence-ID: 13224 ADVERTISE
Registration-Timeout: 1000
Advertisement-Timeout: 2500
Commit-Timeout: 30
Cancel-Timeout: 15
Publish-Timeout: 500
Subscribe-Timeout: 5000
Retry-Count: 3
Content-Type: application/sdf; charset=utf-8
Content-Length: 100
    <?xml version="1.0" encoding="UTF-8"?>
    <domain name="iaas.compute" type="capability" def="sdn"/>
```

The ADVERTISE message also has the function of globally configuring corresponding service nodes by sending out Timer and Counter information in the message itself. Each transaction can subsequently override these values for that transaction alone. Unless overridden in those requests, these values apply for all transactions.

At step 530, in some embodiments, on receiving the ADVERTISE message sent at step 520, a service node may respond with a REGISTER message if the domains match. The REGISTER message would be sent after receipt of the ADVERTISE message if the service node has not already registered or upon the expiration of the Registration-Timeout, whichever comes first. The REGISTER message identifies a service node to the proxy and acts as a heartbeat between the proxy and the service nodes. An example REGISTER message follows:

```
REGISTER 1 SOP/1.0
From: default@default.com
To: default@p.provider.com
Exchange: 43shXui7236
Via: SOP/1.0/UDP default@default.com;branch=k9DjR5lbcw
Sequence-ID: 1 REGISTER
Transfer-Mode: service-driven
Node-Type: service-node
Content-Type: application/sdf; charset=utf-8
Content-Length: 100
    <?xml version="1.0" encoding="UTF-8"?>
    <domain name="iaas.compute" type="capability" def="sdn"/>
```

In the example above, the REGISTER message is being sent for the first time to the proxy. The service node does not yet have an identity. The "From" header therefore has a default address. For subsequent REGISTER messages, the identity assigned to the service node in a prior REGISTER message can be used.

At step 540, in some embodiments, after receiving a REGISTER message and after validating that the service node belongs to the service domain that the proxy is configured for, the proxy responds with a 200 OK response, indicating a successful registration. If the REGISTER message had not indicated a unique name (in the "From" field), the proxy response contains a Service-ID header, assigning a name to the service node. The service node uses the assigned Service-ID henceforth, and the proxy may reject all requests that do not match the assigned Service-ID name (the "default" name is always admitted). The proxy matches the name of the requestor against its IP Address that was used during for the REGISTER message for subsequent requests. Example message sent at this step:

```
200 OK 1 SOP/1.0
From: default@p.provider.com
To: default@4357254.provider.com
Exchange: 43shXui7236
Via: SOP/1.0/UDP default@p.provider.com;branch=k9DjR5lbcw
Sequence-ID: 1 REGISTER
Service-ID: 4357254.provider.com
```

At step 550, in some embodiments, upon a successful registration, the service node sends a PUBLISH message to the proxy providing details about available services. While the REGISTER message is sent periodically, the PUBLISH message is sent when service availability changes, after the first registration, or when the Publish-Timeout expires, whichever comes first. A service node can send the PUBLISH message after service creation or deletion to update the proxy about its new capabilities (which may be increased or decreased). An example of a message sent at this step follows:

```
PUBLISH 1 SOP/1.0
From: default@4357254.provider.com
To: default@p.provider.com
```

```
Exchange: 43shXui7236
Via: SOP/1.0/UDP default@4357254.provider.com;branch=k9DjR5lbcw
Sequence-ID: 13432 PUBLISH
Distance: 1
Node-Type: service-node
Content-Type: application/sdf; charset=utf-8
Content-Length: 513
<?xml version="1.0" encoding="UTF-8"?>
<domain name="iaas.compute" type="capability" def="sdn">
    <!-- list of domain attributes -->
</domain>
<domain name="iaas.compute" type="availability" def="sdn">
    <!-- list of domain attributes -->
</domain>
```

The PUBLISH message lists capabilities for its domains.

At step 660, in some embodiments, upon receipt of the PUBLISH message, the proxy forwards it to an appropriate workflow server. This can allow the workflow server to know of the service node's capabilities which can then be utilized in service allocations. After successfully updating its service repository, the workflow server responds with a 200 OK response (step 560). The proxy forwards the 200 OK response back to the service node (step 580). An example of this response follows:

```
200 OK 1 SOP/1.0
From: default@p.provider.com
To: default@4357254.provider.com
Exchange: 43shXui7236
Via: SOP/1.0/UDP default@p.provider.com;branch=k9DjR5lbcw
Sequence-ID: 13432 PUBLISH
```

Figure 6:
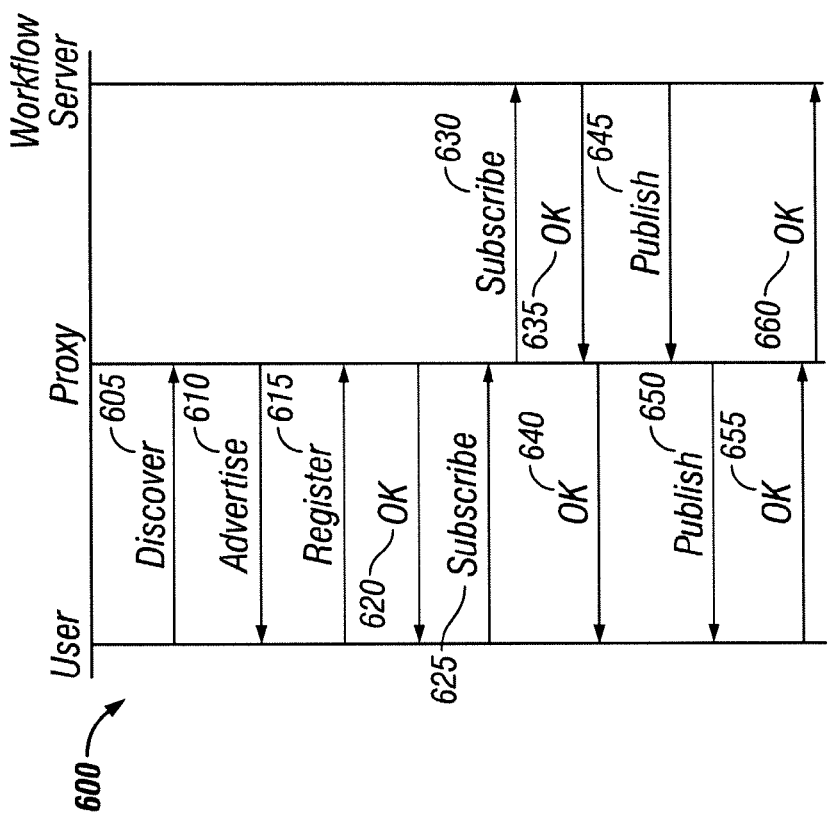
FIG. 6 illustrates a message flow for a user discovering a proxy.

FIG. 6 illustrates how a user (at a customer node such as customer node 102 of FIG. 1) may discover a proxy. At step 605, in some embodiments, the user sends the proxy a unicast DISCOVER message. In response, at step 610, the proxy sends the user an ADVERTISE message which can include network configuration of timers, counters, and other suitable parameters. At step 620, a REGISTER message is sent from the user to the proxy. This step may be performed in a similar manner as step 530 of FIG. 5. At step 620, the proxy sends a 200 OK message to the user. This step may be performed in a similar manner as step 540 of FIG. 5.

In some embodiments, at step 625 a SUBSCRIBE message is sent by a user. It may be done after a new registration, when the interest list of services of the user changes, or upon the expiration of the Subscribe-Timeout, whichever comes first. The SUBSCRIBE message is a request-response sequence and the proxy sends a 200 OK response if the SUBSCRIBE message matches the service capabilities of the proxy. If a proxy's service capabilities change, the proxy sends out a new ADVERTISE message listing new domain capabilities. If those capabilities are of interest to a user, a new SUBSCRIBE message may be sent expressing interest in receiving information about those services. If a SUBSCRIBE message is sent without any specific domain, the proxy interprets it as an interest in all service domains. The user includes the Node-Type as a "service-client". An example message sent at step 625 follows:

```
SUBSCRIBE 1 SOP/1.0
From: default@ws.provider.com
To: default@p.provider.com
Via: SOP/1.0/UDP default@ws.provider.com;branch=k9DjR5lbcw
Exchange: 43shXui7236
```

```
Timestamp: 1285162130
Sequence-ID: 1 SUBSCRIBE
Node-Type: service-client
Content-Type: application/sdf; charset=utf-8
Content-Length: 154
<?xml version="1.0" encoding="UTF-8"?>
<domain name="iaas.compute" type="capability" def="sdn/>
```

At step 630, in some embodiments, the proxy forwards the SUBSCRIBE message to a workflow server. This may happen when a SUBSCRIBE message identifies service domains that the proxy can support. The workflow server validates whether the user is authorized to receive those services. If the user is authorized, the workflow server responds with a 200 OK response (step 635) to the proxy. At step 640, the proxy forwards the 200 OK response to the user (step 640). An example of this response follows:

```
200 OK 1 SOP/1.0
From: default@p.provider.com
To: default@ws.provider.com
Exchange: 43shXui7236
Via: SOP/1.0/UDP default@p.provider.com;branch=k9DjR5lbcw
Sequence-ID: 1 SUBSCRIBE
```

At step 645, in some embodiments, the workflow server sends updates on services through the PUBLISH message. These updates are sent after the first SUBSCRIBE message is received, whenever services availability changes (e.g., new services are available or old ones are removed), or upon expiration of a Publish-Timer, whichever comes first. The PUBLISH message is forwarded to the proxy which will send it to the user (step 650). The proxy changes the From header to its own address in some embodiments. This may serve to hide the workflow server from the user. The workflow server can identify categories of information to the user through a PUBLISH message. Examples follow:

A workflow server may forward details of every service node available in its network to the user and their individual service capabilities.

A workflow server may only forward aggregated status of service nodes in the network, aggregated by service domains, geographies, or other criteria.

A workflow server may indicate that it supports services from a certain domain.

A workflow server may send to the user a list of all workflows available that may be of interest to the user.

A workflow server may filter available workflows and send only those workflows that have been explicitly configured for the user.

Accordingly, the PUBLISH message can have different types of content. The receiving proxy uses the Node-Type header to apply a node-specific policy of publishing (in conjunction with other policies). The example below shows a PUBLISH message that publishes a workflow.

```
PUBLISH 1 SOP/1.0
From: default@p.provider.com
To: consumer@customer.com
Exchange: 43shXui7236
Via: SOP/1.0/UDP default@4357254.provider.com;branch=k9DjR5lbcw
Sequence-ID: 13432 PUBLISH
Distance: 1
Content-Type: application/sdf; charset=utf-8
Content-Length: 513
```

-continued

```
<?xml version="1.0" encoding="UTF-8"?>
<workflow name="X32mnTrUwq" anchor="p.provider.com">
  <description>workflow description</description>
  <taskgroup id="1" prev="idle" next="idle">
    <description>taskgroup description</description>
    <task id="1" prev="idle" next="2" action="CREATE">
      <domain name="iaas.compute" type="capability" def="sdn">
        <!--list of domain attributes -->
      </domain>
    </task>
    <task id="2" prev="1" next="idle" action="CREATE">
      <domain name="iaas.network" type="capability" def="sdn">
        <!--list of domain attributes -->
      </domain>
    </task>
  </taskgroup>
</workflow>
```

The workflow contains a list of tasks, domains and attributes, that the user needs to populate. The workflow server can mask one or more of the tasks, service domains, and attributes of a workflow that are visible to a user. In effect, the user specifies certain portions of the workflow, and leave the rest to the workflow server. The workflow can be viewed as an API exposed to the user where the user is allowed to identify certain parameters before communicating with the proxy.

At step 655, in some embodiments, after receiving the PUBLISH message, the user responds with a 200 OK response confirming receipt of the message. If the user accepts the workflow, it sends a 200 OK response which is forwarded from the proxy to the workflow server (step 660). An example of such a response follows:

```
200 OK 1 SOP/1.0
From: consumer@customer.com
To: default@p.provider.com
Exchange: 43shXui7236
Via: SOP/1.0/UDP default@customer.com;branch=k9DjR5lbcw
Sequence-ID: 1 PUBLISH
```

Figure 7:
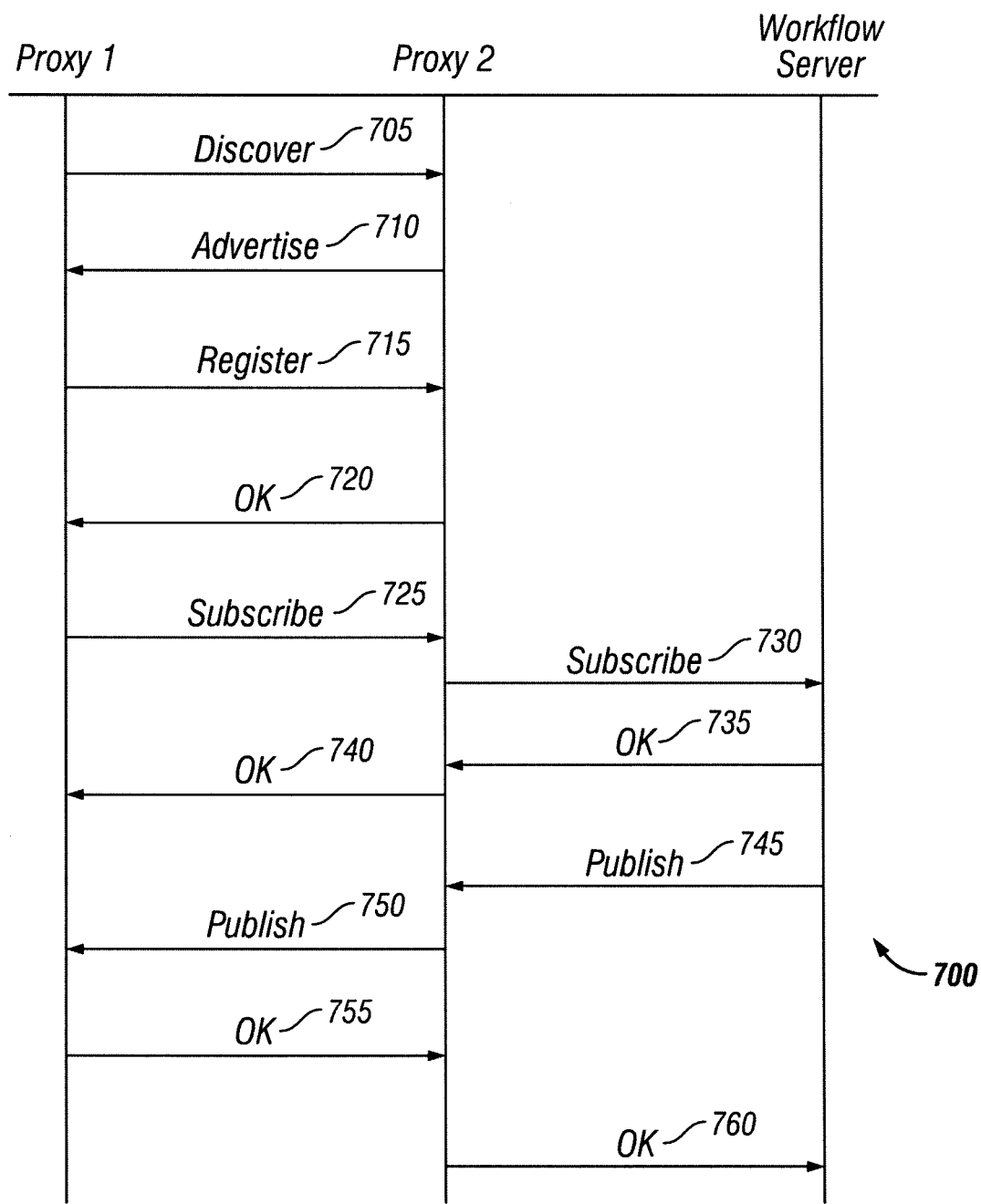
FIG. 7 illustrates a message flow for a proxy discovering another proxy.

FIG. 7 illustrates how a proxy (referred to as proxy 1) can discover another proxy (referred to as proxy 2). Flow 700 is similar to flow 600 of FIG. 6. At step 705, a DISCOVER message is sent from proxy 1 to proxy 2. At step 710, an ADVERTISE message is sent from proxy 2 to proxy 1. A REGISTER message is sent from proxy 1 to proxy 2 (at step 715). A 200 OK response is sent in response from proxy 2 to proxy 1 (at step 720). Steps 705-720 may be performed in a similar manner as discussed above with respect to steps 605-620 of FIG. 6.

At step 725, in some embodiments, a SUBSCRIBE message is sent from proxy 1 to proxy 2 along with the service domains that it is interested in. This is done in a similar manner as step 625 of FIG. 6. The Node-Type header is set to "service-proxy". The subscribing proxy 1 receives service information. Proxy 2 forwards the SUBSCRIBE message to a workflow server at step 730 (in a manner similar to step 630 of FIG. 6).

At step 735, in some embodiments, workflow server sends a 200 OK response to proxy 2. At step 740, this response is forwarded to proxy 1. These steps are performed in a similar manner as steps 635 and 640 of FIG. 6.

At step 745, in some embodiments, workflow server sends a PUBLISH message to proxy 2. This message includes information about the workflows, including management information and details or summaries of current capacities (depending on configured policies). Proxy 2, at step 750, forwards the PUBLISH message to proxy 1. A 200 OK response is sent from proxy 1 to proxy 2 at step 755. Proxy 2 forwards the 200 OK response to the workflow server at step 760. Steps 735-760 are performed in a similar manner to steps 635-660 of FIG. 6.

Figure 8:
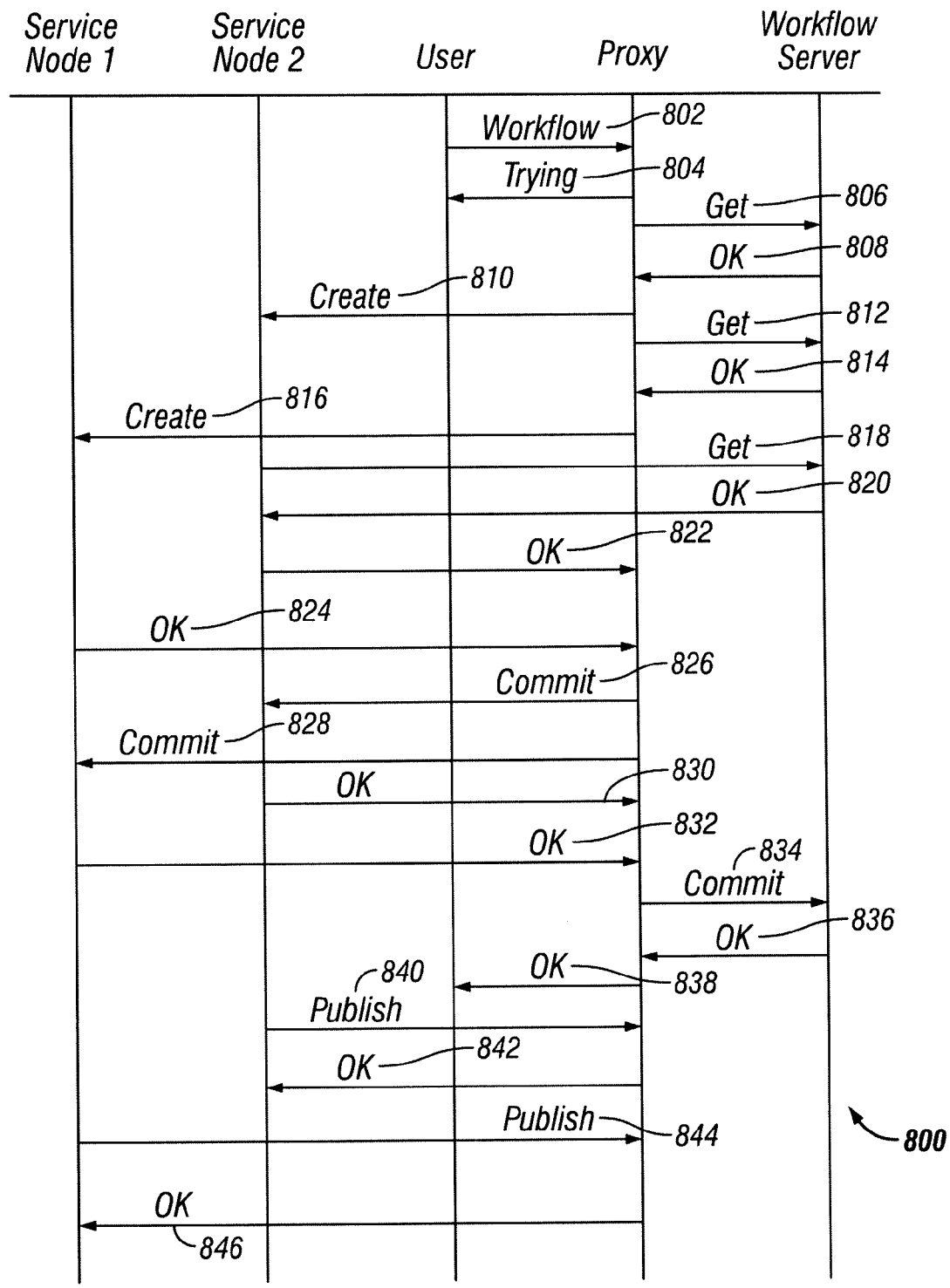
FIG. 8 illustrates a message flow for provisioning a service.

FIG. 8 is a message flow diagram illustrating an example service provisioning flow. The entities involves in this example include two service nodes (service node 1 and service node 2), a user (e.g., at a customer node such as customer node 102 of FIG. 1), a proxy, and a workflow server. The discussion above with respect to FIG. 1 provides example implementations of these entities.

At step 802, in some embodiments, a user initiates a workflow by sending a WORKFLOW message. An example of this message follows:

```
WORKFLOW 1 SOP/1.0
From: consumer@customer.com
To: default@p.provider.com
Exchange: 43shXui7236
Via: SOP/1.0/UDP default@p.customer.com;branch=k9DjR5lbcw
Sequence-ID: 5 WORKFLOW
Workflow-Name: gTyuI82Zx@provider.com
```

The user indicates a Workflow-Name that already exists. This message may contain a detailed specification of the workflow tasks and parameters. As the WORKFLOW request traverses the network towards a workflow anchor, the request may be modified in transit by intermediate proxies. Each proxy looks up the source of the Workflow-Name and forwards it to another proxy until it gets to the proxy that will serve as the workflow anchor (which is illustrated in FIG. 8).

In some embodiments, at step 804, the proxy serving as the workflow anchor sends a 100 Trying response to indicate to the user that it has received the request and is processing it. An example of this response follows:

```
100 TRYING 1 SOP/1.0
From: default@p.provider.com
To: consumer@customer.com
Exchange: 43shXui7236
Via: SOP/1.0/UDP default@p.provider.com;branch=k9DjR5lbcw
Sequence-ID: 5 WORKFLOW
Workflow-Name: gTyuI82Zx@provider.com
```

At step 806, in some embodiments, the proxy sends a GET request to a corresponding workflow server seeking detailing of the workflow. If the original request (sent at step 802) was received with a detailed workflow description, the proxy sends the description to the workflow server. The workflow server uses the received workflow to determine a completed and finalized workflow using one or more policies. An example of the GET message follows:

```
GET 1 SOP/1.0
From: default@p.provider.com
To: default@ws.provider.com
Exchange: 43shXui7236
Via: SOP/1.0/UDP default@p.provider.com;branch=k9oIuElbcw
Sequence-ID: 286 WORKFLOW
Workflow-Name: gTyuI82Zx@provider.com
Query-Type: workflow-name
Requestor: consumer@customer.com
```

The GET message includes the requestor name into the Requestor header. This may allow the workflow server to validate whether the indicated workflow is available for the Requestor and apply user-specific policies, if any.

At step 808, in some embodiments, the workflow server will then return a workflow description comprising of individual tasks using a 200 OK response. An example of this follows:

```
200 OK 1 SOP/1.0
From: default@ws.provider.com
To: default@p.provider.com
Exchange: 43shXui7236
Via: SOP/1.0/UDP ws@p.provider.com;branch=cw8gtrB56m
Sequence-ID: 286 GET
Workflow-Name: gTyuI82Zx@provider.com
Workflow-ID: 68743693
Query-Type: workflow-name
Requestor: consumer@customer.com
Content-Type: application/sdf; charset=utf-8
Content-Length: 542
<?xml version="1.0" encoding="UTF-8"?>
<workflow name="gTyuI82Zx" id="68743693"
    xmlns:sdf="http://sdf.org/sdf">
  <description>workflow description</description>
  <taskgroup id="1" prev="idle" next="idle">
    <description>taskgroup description</description>
    <task id="1" prev="idle" next="idle" action="CREATE"
        server="4357254.provider.com reference="67439375"
        status="pending"/>
  </taskgroup>
</workflow>
```

At this point, the workflow server has created an instance of a workflow, based on the request sent at step 802 using one or more policies. This instance is referenced by the Workflow-ID "68743693". In this example, it carries a detailed configuration of a virtual machine, which is referenced by a Task-ID="67439375". The workflow server has allocated a server "4357254.provider.com" for the "CREATE" task.

At step 810, in some embodiments, the proxy sends a CREATE request to the selected server, service node 2. An example of this message follows:

```
CREATE 1 SOP/1.0
From: default@p.provider.com
To: default@4357254.provider.com
Exchange: 43shXui7236
Via: SOP/1.0/UDP default@p.provider.com;branch=k9DjR5lbcw
Sequence-ID: 134 CREATE
Task-ID: 67439375
Workflow-Server: ws.provider.com
Requestor: consumer@customer.provider.com
```

The above CREATE request is sent by the proxy "p.provider.com" to a server "4357254.provider.com". The CREATE message informs the receiver that there is a Task-ID "67439375" pending at "ws.provider.com". The receiver should obtain that task and execute it. The Requestor field describes the user on whose behalf the request is proxied.

At step 812, in some embodiments, the proxy may request a second task to be performed by service node 1 from the workflow server using a GET message. At step 814, workflow server may be configured to send the requested information using a 200 OK response message. At step 816, proxy may use a CREATE message to service node 1 informing service node 1 of the task. Steps 812, 814, and 816 may be implemented in a manner similar to 806, 808, and 810.

At step 818, in some embodiments, service node 2 downloads the task description from the workflow server, identified by the Task ID, using a GET request. An example follows:

```
GET 1 SOP/1.0
From: default@4357254.provider.com
To: default@ws.provider.com
Exchange: 43shXui7236
Via: SOP/1.0/UDP default@4357254.provider.com;branch=cw8gtrB56m
Sequence-ID: 390 GET
Query-Type: task-id
Task-ID: 67439375
```

The workflow server, at step 820, forwards a task description to the requestor, as shown below. The task describes a workflow to be executed by the receiver, pertaining to a domain "iaas.compute":

```
200 OK 1 SOP/1.0
From: default@ws.provider.com
To: default@4357254.provider.com
Exchange: 43shXui7236
Via: SOP/1.0/UDP default@ws.provider.com;branch=cw8gtrB56m
Sequence-ID: 390 GET
Task-ID: 67439375
Query-Type: task-id
Content-Type: application/sdf; charset=utf-8
Content-Length: 655
<?xml version="1.0" encoding="UTF-8"?>
<workflow name="gTyuI82Zx" id="68743693"
    xmlns:sdf="http://sdf.org/sdf">
  <description>workflow description</description>
  <taskgroup id="1" prev="idle" next="idle">
    <description>taskgroup description</description>
    <task id="1" prev="idle" next="idle"
        server="4357254.provider.com ">
      <domain name="iaas.compute" def="sdn">
        <!-- list of domain attributes -->
      </domain>
    </task>
  </taskgroup>
</workflow>
```

If service node 2 does not understand the task schema, it can discard the description and send a 400 BAD REQUEST response. After completing the processing, service node 2 sends a 200 OK response at step 822. An example of this follows:

```
200 OK 1 SOP/1.0
From: default@4357254.provider.com
To: default@p.provider.com
Exchange: 43shXui7236
Via: SOP/1.0/UDP default@4357254.provider.com;branch=k9DjR5lbcw
Sequence-ID: 134 CREATE
```

Similarly, service node 1 sends a 200 OK response at step 824 after completing the processing associated with the CREATE message sent at step 816.

At steps 826 and 828, in some embodiments, the proxy commits the service by sending COMMIT messages to service nodes 1 and 2. The COMMIT message is useful when: (a) the workflow may involve many transactions in parallel and the proxy may not commit requests if one of the transactions fails, (b) the proxy may have failed after making request, and the service node will then cancel the earlier transaction and delete services. The Commit-Timeout timer (received via the ADVERTISE message) determines when transactions must be cancelled. An example COMMIT message follows:

```
COMMIT 1 SOP/1.0
From: default@p.provider.com
To: default@4357254.provider.com
Exchange: 43shXui7236
Via: SOP/1.0/UDP default@p.provider.com;branch=khewui6GDw
Sequence-ID: 134 COMMIT
Task-ID: 67439375
Workflow-Server: ws.provider.com
Requestor: consumer@customer.provider.com
```

On receiving the COMMIT message, the service nodes "activate" the services if the services were dormant and send a 200 OK response (illustrated as steps 830 and 832). An example of this message follows:

```
200 OK 1 SOP/1.0
From: default@4357254.provider.com
To: default@p.provider.com
Exchange: 43shXui7236
Via: SOP/1.0/UDP default@4357254.provider.com;branch=khewui6GDw
Sequence-ID: 134 COMMIT
```

The service nodes also send PUBLISH messages indicating their new capabilities and service availability. The capabilities may have been reduced. This is illustrated at steps 840 and 844. Responses to these PUBLISH messages using 200 OK responses are sent to the service nodes by the proxies at steps 842 and 846.

At step 834, in some embodiments, the proxy sends a COMMIT message using the Workflow-ID to the workflow server. This is a reference to be used at the time of service deletion, and they will define how create actions have to be reverted. Upon receiving a COMMIT message, the workflow server creates a workflow description that the proxy can send to the user. In some embodiments, only certain tasks need to be made visible to the user. For example, if the use was allocating a virtual machine, the address of the switch to which the virtual machine is attached should not be known, although the address of the virtual machine itself should be known. The workflow server returns a workflow description that can be passed to the user. The workflow server returns this reduced task list to the proxy as part of a 200 OK response (at step 836), an example follows:

```
200 OK 1 SOP/1.0
From: default@p.provider.com
To: consumer@customer.com
Exchange: 43shXui7236
Via: SOP/1.0/UDP default@p.provider.com;branch=k9DjR5lbcw
Sequence-ID: 5 WORKFLOW
Workflow-Name: gTyuI82Zx@provider.com
Workflow-ID: 68743693
Content-Type: application/sdf; charset=utf-8
Content-Length: 655
<?xml version="1.0" encoding="UTF-8"?>
<workflow name="gTyuI82Zx" id="68743693"
   xmlns:sdf="http://sdf.org/sdf">
  <description>workflow description</description>
  <taskgroup id="1" prev="idle" next="idle">
    <description>taskgroup description</description>
    <task id="1" prev="idle" next="idle" action="CREATE">
      <domain name="iaas.compute" type="capability" def="sdn">
        <!-- list of domain attributes -->
      </domain>
    </task>
  </taskgroup>
</workflow>
```

The proxy forwards (at step 838) the reduced task list information to the user as part of the response to the original WORKFLOW request. This information helps the user understand certain information about the service, as well as what it needs to know to modify, delete or transfer this service in future. The user may obtain this information again using a GET query specifying a specific Workflow-ID, Task-ID, and/or other suitable information. The user may also send a GET query on a Workflow-Name, with Query-Type set to "active-workflows" and obtain all active Workflow-IDs using a given workflow name. The Workflow-IDs can then be used to query Task-IDs and details of those task and Workflow IDs. The workflow server that responds to these queries can, in some embodiments, ensure that it is only sharing user-relevant information and not information that the provider considers private.

In some embodiments, service deletion works similar to flow 800 regarding provisioning a service. In service deletion, the initiating workflow is defined to be deleting a service instead of creating one. The deletion workflow request includes the prior Workflow-ID and/or Task-ID. An example of this request follows:

```
WORKFLOW 1 SOP/1.0
From: consumer@customer.com
To: default@p.provider.com
Exchange: 43shXui7236
Via: SOP/1.0/UDP default@p.customer.com;branch=k9DjR5lbcw
Sequence-ID: 5 WORKFLOW
Workflow-Name: xhsdfpjTRm@provider.com
Workflow-ID: 68743693
```

The proxy sends a GET message to the workflow server, asking for a workflow description. The workflow server returns a workflow that is nearly opposite from the workflow used in flow 800 due to the actions of provisioning are reversed in deletion. The order of tasks may be determined by the deletion workflow. An example of the deletion workflow follows:

```
200 OK 1 SOP/1.0
From: default@ws.provider.com
To: default@p.provider.com
Exchange: 43shXui7236
Via: SOP/1.0/UDP ws@p.provider.com;branch=cw8gtrB56m
Sequence-ID: 286 GET
Workflow-Name: xhsdfpjTRm@provider.com
Workflow-ID: 68743693
Requestor: consumer@customer.com
Content-Type: application/sdf; charset=utf-8
Content-Length: 542
<?xml version="1.0" encoding="UTF-8"?>
<workflow name="xhsdfpjTRm" id="634794594"
   xmlns:sdf="http://sdf.org/sdf">
  <description>workflow description</description>
  <taskgroup id="1" prev="idle" next="idle">
    <description>taskgroup description</description>
    <task id="1" prev="idle" next="idle" type="DELETE">
      <domain name="iaas.compute" alias="d1" def="sdn">
        <!-- list of domain attributes -->
      </domain>
    </task>
  </taskgroup>
</workflow>
```

The workflow server allocates a new Workflow-ID and provides tasks that reverse earlier service creation. The new Workflow-ID has a reference to the earlier Workflow-ID. In this example, the task type is set to "DELETE." The rest of the process remains unchanged from the process depicted in FIG. 8. COMMIT on the workflow server deletes the original Workflow-ID and Task-ID along with the new workflow and Task IDs that were created as part of the delete operation.

In some embodiments, the service update message flow is similar to that depicted in FIG. 8. One difference is that the WORKFLOW request references prior Workflows and/or Tasks that are modified by the UPDATE message. The service update workflow request includes the prior Workflow-ID and/or Task-ID. The WORKFLOW request may also have a set of attributes being modified. Alternately, the request may invoke a workflow while the attribute changes are determined by the workflow server. An example WORKFLOW requests follows:

```
WORKFLOW 1 SOP/1.0
From: consumer@customer.com
To: default@p.provider.com
Exchange: 437eYE3XY
Via: SOP/1.0/UDP default@p.customer.com;branch=k9DjR5lbcw
Sequence-ID: 5 WORKFLOW
Workflow-Name: xhsdfpjTRm@provider.com
Workflow-ID: 68743693
```

The proxy sends a GET message to the workflow server, asking for a workflow description. The workflow server returns a "modified" workflow in the sense that its tasks include service updates and references prior tasks. The order of tasks in the workflow is determined by the update workflow. An example of the workflow server's response follows:

```
200 OK 1 SOP/1.0
From: default@ws.provider.com
To: default@p.provider.com
Exchange: 437eYE3XY
Via: SOP/1.0/UDP ws@p.provider.com;branch=cw8gtrB56m
Sequence-ID: 286 GET
Workflow-Name: xhsdfpjTRm@provider.com
Workflow-ID: 68743693
Requestor: consumer@customer.com
Content-Type: application/sdf; charset=utf-8
Content-Length: 542
<?xml version="1.0" encoding="UTF-8"?>
<workflow name="xhsdfpjTRm" id="439356943"
    xmlns:sdf="http://sdf.org/sdf">
  <description>workflow description</description>
  <taskgroup id="1" prev="idle" next="idle">
    <description>taskgroup description</description>
    <task id="1" prev="idle" next="idle" type="UPDATE">
      <domain name="iaas.compute" alias="d1" def="sdn">
        <!-- list of domain attributes -->
      </domain>
    </task>
  </taskgroup>
</workflow>
```

The workflow server allocates a new Workflow-ID and provides tasks that update the earlier service creation. The new Workflow-ID has a reference to the earlier Workflow-ID. The task type in the example is set to "DELETE". When this update is completed, the proxy commits the tasks and workflow using the COMMIT message. In response to the COMMIT message, the workflow server may delete the Workflow-ID and Task-ID associated with the service update workflow and update the original Workflow-ID.

Figure 9:
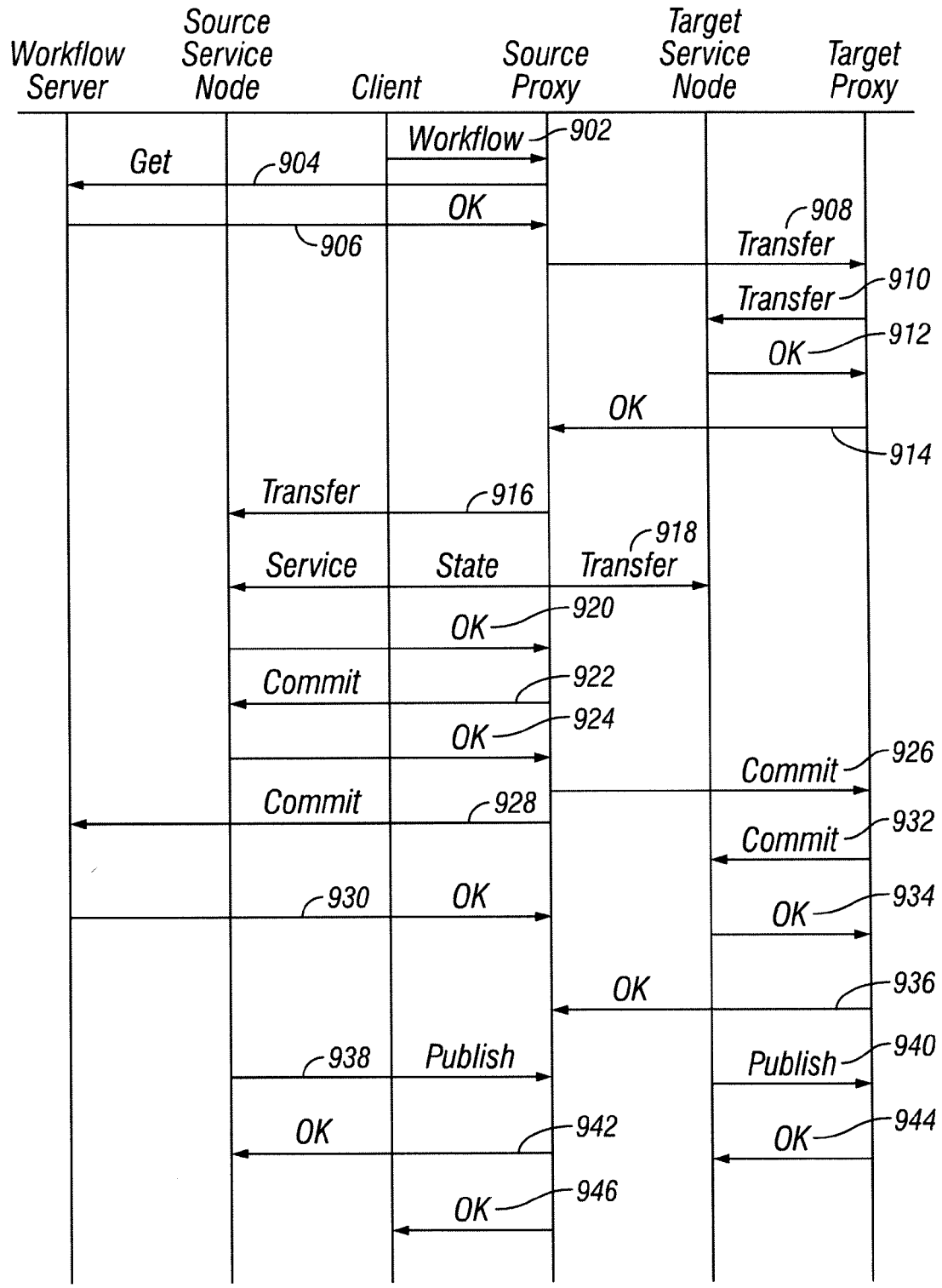
FIG. 9 illustrates a message flow for stateful service mobility.

FIG. 9 illustrates an example of messages used in stateful service mobility. In stateful mobility, in some embodiments, live state of a service is transferred from a source service node to a target service node. The actual state transfer of services may use existing protocols such as FTP to copy a service state. Flow 900 illustrates the control session that identifies resources used to transfer service states.

At step 902, in some embodiments, a client (e.g., customer node 102 of FIG. 1) initiates service mobility by sending a WORKFLOW message. The message includes references to past workflows and/or Task-IDs that need to be moved. The source proxy receives the WORKFLOW message and forwards the content of the WORKFLOW message to the workflow server using a GET message (at step 904) to obtain a description of the workflow. An example of the GET message follows:

```
GET 1 SOP/1.0
From: default@p1.provider.com
To: default@ws.provider.com
Exchange: 43shXui7236
Via: SOP/1.0/UDP default@p1.provider.com;branch=k9oluElbcw
Sequence-ID: 286 WORKFLOW
Workflow-Name: gTyuI82Zx@provider.com
Query-Type: workflow-name
Requestor: consumer@customer.com
```

At step 906, in some embodiments, if the workflow is authorized for the client and the workflow server can find the appropriate resources to move the service, it sends a 200 OK response. An example of this follows:

```
200 OK 1 SOP/1.0
From: service1@ws.provider.com
To: default@p1.provider.com
Exchange: 43shXui7236
Via: SOP/1.0/UDP default@4357254.provider.com;branch=cw8gtrB56m
Sequence-ID: 1 GET
Content-Type: application/sdf; charset=utf-8
Content-Length: 142
<?xml version="1.0" encoding="UTF-8"?>
<workflow name="xhsdfpjTRm" id="634794594">
  <description>workflow description</description>
  <taskgroup id="1" prev="idle" next="idle">
    <description>taskgroup description</description>
    <task id="1" prev="idle" next="2" type="TRANSFER"
        server="p2.provider.com" reference="347654933">
      <domain name="iaas.compute" alias="d1" def="sdn">
        <!-- list of domain attributes -->
      </domain>
    </task>
    <task id="2" prev="1" next="idle" type="TRANSFER"
        server="p2.provider.com" reference="4354395374">
      <domain name="iaas.compute" alias="d1" def="sdn">
        <!-- list of domain attributes -->
      </domain>
    </task>
  </taskgroup>
</workflow>
```

At step 908, in some embodiments, the source proxy begins executing the service transfer by sending a TRANSFER message to the target proxy. The target proxy may be selected by the workflow server and populated as the "server" in the <domain> element of the task. An example of the TRANSFER message follows:

```
TRANSFER 1 SOP/1.0
From: default@p1.provider.com
To: default@p2.provider.com
Exchange: 4j253TyXuM6
Via: SOP/1.0/UDP default@p1.provider.com;branch=XsMf634d2W
Sequence-ID: 1 TRANSFER
Source: service1@4357254.provider.com
Transfer-Mode: service-mobility
Requestor: default@p1.provider.com
```

```
Content-Type: application/sdf; charset=utf-8
Content-Length: 142
<?xml version="1.0" encoding="UTF-8"?>
<domain name="iaas.compute" type="capability" def="sdn">
    <!-- list of domain attributes -->
</domain>
```

In some embodiments, the target proxy selects the target service node for the service based on the received service description. After that, it will forward the TRANSFER request (at step 9100 to the selected service node to prepare it for receiving the service. If the allocation fails, the target proxy may reject the request. An example of the TRANSFER message follows:

```
TRANSFER 1 SOP/1.0
From: default@p2.provider.com
To: default@sn2.provider.com
Exchange: 4j253TyXuM6
Via: SOP/1.0/UDP default@p1.provider.com;branch=XsMf634d2W,
    SOP/1.0/UDP default@p2.provider.com;branch=dfdsye50ZR
Sequence-ID: 1 TRANSFER
Source: service1@4357254.provider.com
Transfer-Mode: stateful
Requestor: default@p1.provider.com
Content-Type: application/sdf; charset=utf-8
Content-Length: 142
<?xml version="1.0" encoding="UTF-8"?>
<domain name="iaas.compute" type="capability" def="sdn">
    <!-- list of domain attributes -->
</domain>
```

In this example, the "Requestor" and "Source" headers are preserved to let the target source node know the identity of the proxy and service being moved. If the target service node approves of the move (e.g., it has the necessary service domain capabilities and resources) it sends a 200 OK response (at step 912). The target service node may approve a modified service description from the one it received. The target service node must also add a "Destination" header as the name of the target service. An example of the response sent at step 912 follows:

```
200 OK 1 SOP/1.0
From: default@sn2.provider.com
To: default@p2.provider.com
Exchange: 4j253TyXuM6
Via: SOP/1.0/UDP default@p2.provider.com;branch=dfdsye50ZR,
    SOP/1.0/UDP default@p1.provider.com;branch=XsMf634d2W
Sequence-ID: 1 TRANSFER
Requestor: default@p1.provider.com
Source: service1@sn1.provider.com
Destination: service2@sn2.provider.com
Content-Type: application/sdf; charset=utf-8
Content-Length: 142
<?xml version="1.0" encoding="UTF-8"?>
<domain name="iaas.compute" type="capability" def="sdn">
    <!-- list of domain attributes -->
</domain>
```

The target proxy sends the response to the source proxy at step 914. On receiving the 200 OK response, the source proxy uses the received service description and sends it in a TRANSFER message to the source service node at step 916. If the source service node approves it, the source service node initiates service creation (at step 918) using the Source and Destination headers as the From and To headers. If the service transfer is successful (indicated by the 200 OK response sent at step 920), the source proxy sends COMMIT messages to the source service node (at step 922) and to the target service node via the target proxy (at steps 926 and 932). Responses to these messages (200 OK responses) are sent at step 924 from the source service node and from the target node (via the target proxy) to the source proxy. Examples of the COMMIT messages follow:

```
COMMIT 1 SOP/1.0
From: default@p1.provider.com
To: service1@sn1.provider.com
Exchange: 4j253TyXuM6
Via: SOP/1.0/UDP default@p1.provider.com;branch=khewui6GDw
Sequence-ID: 13 COMMIT
Task-ID: 347654933
Source: service1@sn1.provider.com
Destination: service2@sn2.provider.com
COMMIT 1 SOP/1.0
From: default@p1.provider.com
To: service2@sn2.provider.com
Exchange: 4j253TyXuM6
Via: SOP/1.0/UDP default@p1.provider.com;branch=hfs634BDmn,
    SOP/1.0/UDP default@p2.provider.com;branch=hprit5WCQv
Sequence-ID: 5 COMMIT
Task-ID: 4354395374
Source: service1@sn1.provider.com
Destination: service2@sn2.provider.com
```

The source proxy commits the workflow in the workflow server as well so that the new location of the service is known at the workflow server. This location may be used to determine subsequent mobility actions or service deletion. This is performed by sending a COMMIT message from the source proxy to the workflow server (at step 928). The workflow server responds with a 200 OK message at step 930.

At steps 938 and 940, in some embodiments, the source and target service nodes send PUBLISH messages to the source and target proxies, respectively. This may be used to inform these proxies of the capabilities and resources of the service nodes after the service has been transferred. 200 OK responses are sent by the proxies to the service nodes indicating receipt of the PUBLISH messages at steps 942 and 944).

At step 946, in some embodiments, the source proxy sends a 200 OK response to the client indicating the successful completion of the movement of the service.

Figure 10:
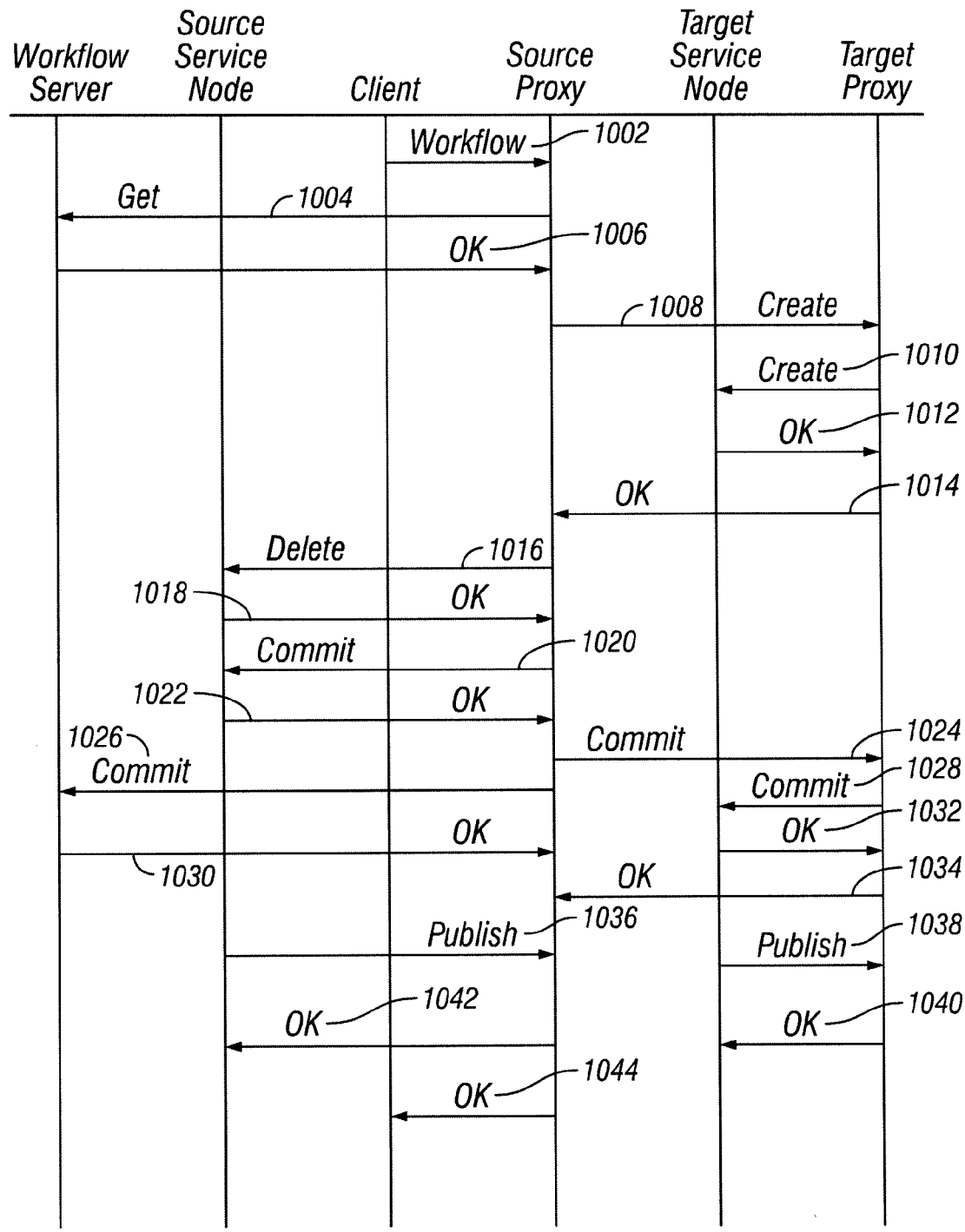
FIG. 10 illustrates a message flow for stateless service mobility.

FIG. 10 illustrates an example set of messages sent to implement stateless service mobility. In stateless service mobility, a new service is created with identical service attributes, although the live state of the current service instance is not copied to the new instance.

At step 1002, in some embodiments, a client (e.g., customer node 102 of FIG. 1) initiates service mobility by sending a WORKFLOW message to the source proxy. This step may be performed similarly to step 902 of FIG. 9. In response, the source proxy may send a GET message (at step 1004) to the workflow server for information regarding the workflow identifed in the message sent at step 1002. The workflow server may send the information in a 200 OK response at step 1006. Steps 1004 and 1006 may be performed in a manner similar to steps 904 and 906 of FIG. 9.

At step 1008, in some embodiments, a CREATE message is sent from the source proxy to the target proxy. This is different than flow 900 in that the TRANSFER message is not used. Instead, the workflow delivers two independent but coordinated tasks, one that creates a new service instance and the other that deletes the old service instance. Details from the information provided at step 1006 are used to implement the CREATE message at step 1008 intended to instruct the target service node to create the service instance being transferred in flow 1000. The target proxy sends the CREATE message at step 1010 to the target service node and receives a 200 OK response from the target service node at step 1012. This response is sent from the target proxy to the source proxy at step 1014.

At step 1016, in some embodiments, the source proxy sends a DELETE message to the source service node. This is so that source service node will stop providing the service that is being transferred from it to the target service node. At step 1018, a 200 OK response is sent from the source node to the source proxy in response to the DELETE message.

In some embodiments, COMMIT messages are sent from the source proxy to the source service node (at step 1026), to the target service node via the target proxy (at steps 1024 and 1028), and to the workflow server at step (1026). This may be performed in a manner similar to steps 922, 926, 928, and 932 of FIG. 9. Responses (e.g., 200 OK responses) to these COMMIT messages are sent to the source proxy at steps 1022, 1030, 1032, and 1034. These responses may be implemented in a manner similar to steps 924, 930, 934, and 936.

At steps 1036 and 1038, in some embodiments, the source and target service nodes send PUBLISH messages to the source and target proxies, respectively. This may be used to inform these proxies of the capabilities and resources of the service nodes after the service has been transferred. 200 OK responses are sent by the proxies to the service nodes indicating receipt of the PUBLISH messages at steps 1040 1042).

At step 1044, in some embodiments, the source proxy sends a 200 OK response to the client indicating the successful completion of the movement of the service. Flow 1000 may be useful when the state of the service resides outside the service node (e.g. an external database). Flow 1000 may be used for disaster recovery, geographical redundancy, or moving capacity dynamically from one site to another.

Advantages may be realized in one or more of the examples discussed above with respect to FIGS. 1-12. For example, service deployments may cross customer and service provider boundaries. Each customer or service provider may be able to enforce policy rules for service usage at ingress and egress points. As another example, separate service-dependent and service-independent functions may be defined in a network. A service consumer or provider may not have to upgrade their infrastructure in order to deploy or use a new service. Separation allows new service deployment without disrupting the network of existing services. As another example, scaling of service across many consumers, service types and locations may be facilitated by distribution of service functionality. Service-dependent information for a set of customers might be stored in one network element or information related to one class of services may be centralized in one network element. All customers in one particular geography or location may access services from one particular network element. As another example, bundling and tiering of services may be facilitated. Bundling may include two or more services that work independently but have improved functionality by being combined. Services may be deployed in bundles that may include a virtual machine, storage resources, quality of service parameters and controls, access control, and intrusion prevention. Tiering may involve one service using another service for its functioning (e.g., a software-as-a-service (SaaS) might use a platform-as-a-service (PaaS), a PaaS might use an infrastructure-as-a-service (IaaS)). As another example, the ability for users to receive continued service even in case of network failures may be facilitated. As another example, a single service may be customized for different users (e.g., a security device may be improved with intrusion detection). As another example, the creation of new services may be simplified while giving the flexibility to both customers and providers to control service-specific parameters and configurations.

Another example of an advantage is extensions are provided for that allow for service variety. Given the variety of cloud applications and to allow flexibility within a standard way of communicating service information, a separation of service independent and service dependent items is maintained.

Another example of an advantage is facilitating service deployments that may require complex service combinations. If a virtual machine is being provisioned, network attached storage, security rules that limit access to that storage, firewalls and access controls that restricts access to the virtual machine, bandwidth to the virtual machine, user provisioning for who can access the virtual machine, load-balancers, wide area network (WAN) optimization techniques, and intrusion detection and prevention or techniques to log and report accesses to a service may also be provisioned.

In some embodiments, various disadvantages may be reduced or avoided. For example, HTTP does not have the PUBLISH and SUBSCRIBE methods through which service information can be selectively distributed in a network. HTTP also does not have procedures by which a network of clients and servers can DISCOVER others and ADVERTISE their presence and capabilities before someone does a PUBLISH or SUBSCRIBE. This means that HTTP as an Open Systems Interconnection (OSI Layer 5) protocol is not suitable for discovering agents and services in a network because methods for advertising, discovering, publishing and subscribing do not exist in HTTP. Embodiments discussed above provide solutions to these problems by allowing for interoperability, including PUBLISH, SUBSCRIBE, DISCOVER, and ADVERTISE features.

As another example of a disadvantage that may be reduced or avoided, in the client-server model, a client may need to wait for a response from the server. However, there is generally no mechanism to time out on a request or cancel the request midway. This may make error handling across a request that has been forked a one or more times difficult. For example, if one of the forked legs has failed, the system must wait for the other legs to finish before issuing a request to cancel the other legs. If one of the legs is taking too long, then the other legs are unable to be completed. An HTTP client connection may not be closed immediately and have correct resolution. This problem can also arise network connection loss occurs due to network, software or other failures.

In some embodiments, separation between end-user API control of network-based services and the use of proxies as discussed above may have one or more of the following advantages. It may allow a service provider to support multiple end-user access and control mechanisms without altering their management network. Applications and tools that have been developed using APIs can be migrated to a service provider whose internal network uses management techniques discussed above. API development can create more and more functionalities and features using the same basic capabilities that the management techniques discussed above provide. Rapid innovation and service creation through APIs can thus be de-coupled with certain service management technology in the network. Separation could allow for end-users that do not need to understand the details of how a service is implemented which can be proprietary to a particular provider. A service provider can keep APIs but continuously evolve the internal service implementation logic through policies.

Figure 11:
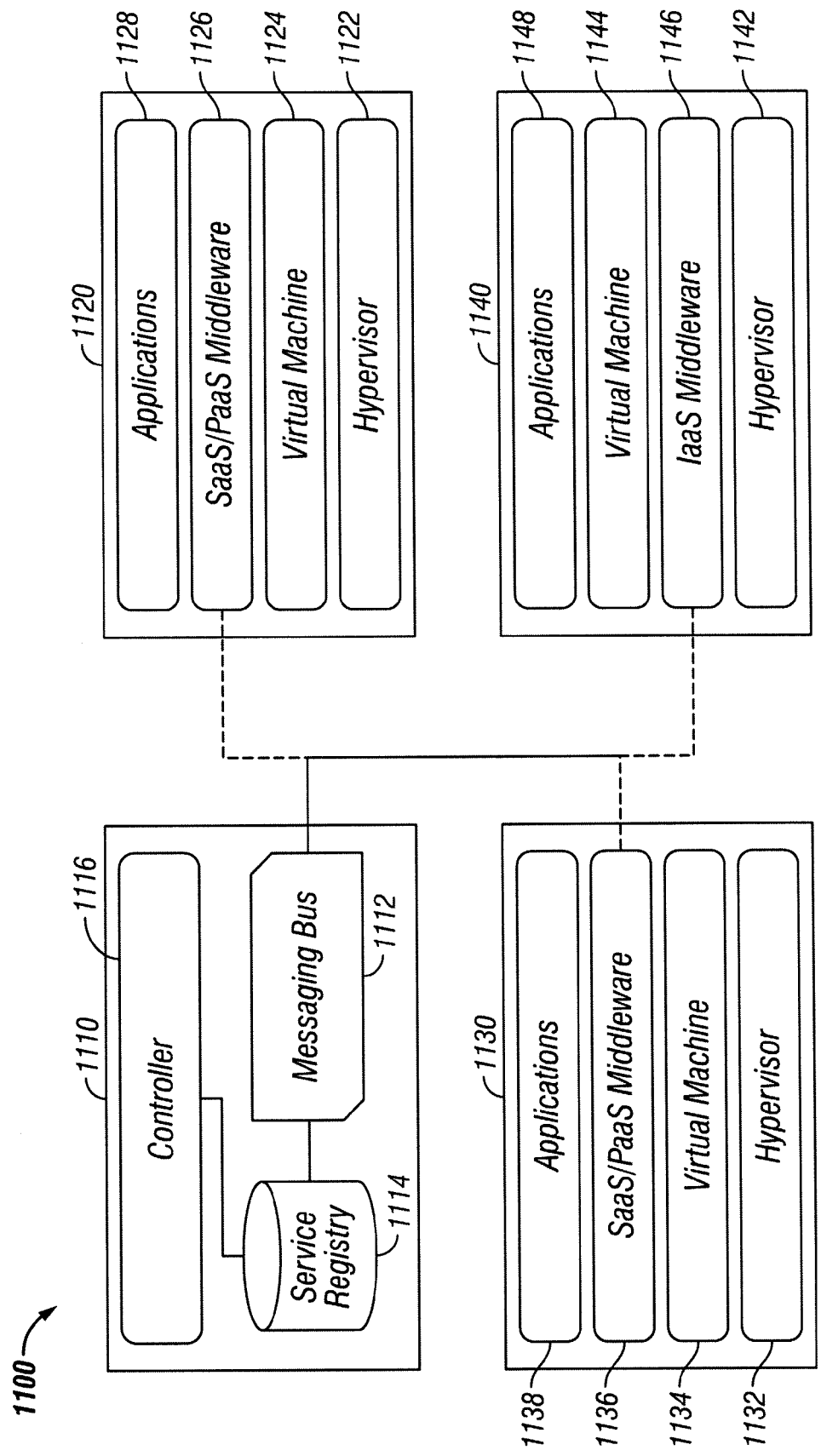
FIG. 11 illustrates an example system for middleware communication between applications.

FIG. 11 depicts an example system 1100 illustrating communication between nodes 1110, 1120, 1130, and 1140 that provide services using the techniques discussed above with respect to FIGS. 1-10. Nodes 1120, 1130, and 1140 provide network-based services and node 1110 can be used to facilitate management of nodes 1120, 1130, and 1140. In operation, middleware in nodes 1120, 1130, and 1140 facilitate communication and collaboration in system 1100.

In some embodiments, node 1110 includes messaging bus 1112, service registry 1114, and controller 1116. Messaging bus 1112 may be configured to communicate with middleware agents 1126, 1136, and 1146. Controller 1116 may be configured to manage services and infrastructure related to nodes 1120, 1130, and 1140. Service registry 1114 may include information regarding applications 1128, 1138, and 1148.

In some embodiments, nodes 1120, 1130, and 1140 may each be configured to provide one or more services using applications 1128, 1138, and 1148. Nodes 1120, 1130, and 1140 may include hypervisors 1122, 1132, and 1142, respectively, as well as virtual machines 1124, 1134, and 1144, respectively. These virtual machines and hypervisors may be used to support applications 1128, 1138, and 1148. Nodes 1120, 1130, and 1140 also include middleware agents 1126, 1136, and 1146 that may be configured to communicate using the same types of messages or protocol (e.g., the messages and protocols discussed above with respect to FIGS. 1-10).

In some embodiments, SaaS and PaaS implementations may use agents (such as middleware agents 1126, 1136, and 1146). These agents can interact with applications (e.g., applications 1128, 1138, and 1148) in nodes 1120, 1130, and 1140. For example, these agents can serve as Middleware and be used to instantiate collaboration, educational, or gaming applications. Cloud controller 1116 can interact with such agents on nodes 1120, 1130, and 1140 instruct them to create new services. The newly created applications can in turn use the middleware to communicate with controller 1116 (e.g., to request resources). As another example, application 1128 may have a certain number of records in a table and application 1128 may request the creation of a new virtual machine with the same application type. SaaS/PaaS middleware agent 1126 can send the request to controller 1116 which then transmits it to IaaS middleware agent 1144 to create a new virtual machine. Once the new virtual machine has been installed, controller 1116 can now instruct the SaaS/PaaS agent 1126 to install a new application. Once the application is ready, messages in a protocol discussed above with respect to FIGS. 1-10 can now be used for sending application specific commands to one or more application instances. This middleware technique can enable across-the-board communications between applications 1128, 1138, and 1148 and controller 1116.

In some embodiments, standard libraries and APIs can be published for interacting with infrastructure, controllers and other applications. Applications (e.g., applications 1128, 1138, and 1148) can use service registry 1114 to locate applications and forward them messages. Service registry 1114 can enable a logical addressing of services (e.g., provided by applications 1128, 1138, and 1148), including addressing beyond domain names. In some embodiments, the domain names may not be known, or the messaging may be based upon service types rather than names of hosts that carry them. Multicast and broadcast messages (without knowing their MAC or IP) can be sent in an authenticated manner using middleware agents 1126, 1136, and 1146.

Figure 12:
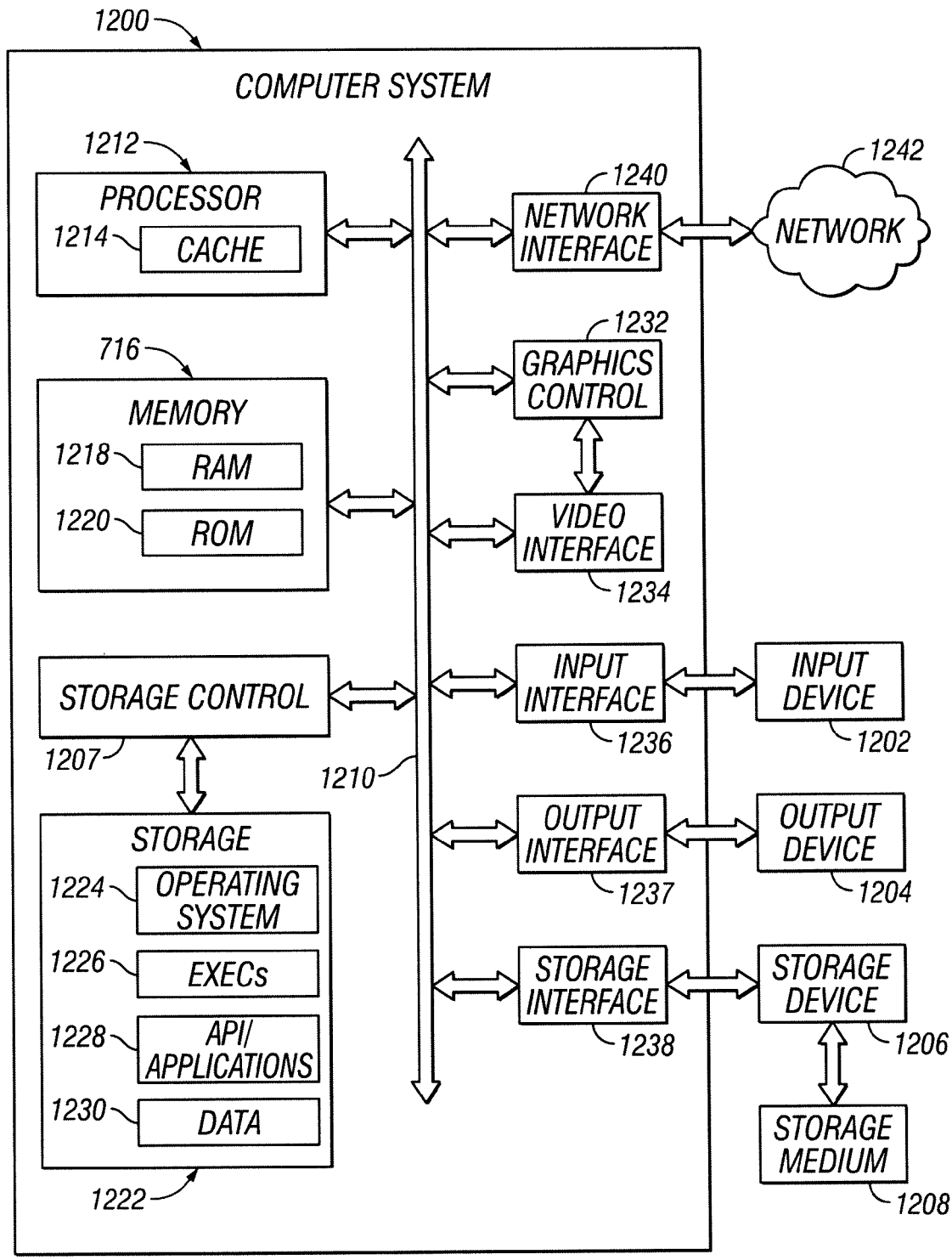
FIG. 12 illustrates an example computer system suitable for implementing one or more portions of particular embodiments.

FIG. 12 illustrates an example computer system 1200 suitable for implementing one or more portions of particular embodiments. Although the present disclosure describes and illustrates a particular computer system 1200 having particular components in a particular configuration, the present disclosure contemplates any suitable computer system having any suitable components in any suitable configuration. Moreover, computer system 1200 may have take any suitable physical form, such as for example one or more integrated circuit (ICs), one or more printed circuit boards (PCBs), one or more handheld or other devices (such as mobile telephones or PDAs), one or more personal computers, or one or more super computers. Components discussed above with respect to FIGS. 1-11 (e.g., customer nodes 102, 104, and 106, service nodes 132, 134, 136, and 138, workflow nodes 122, 124, 126, 128, 128, 152, 154, and 156, proxies 112, 114, 116, 118, 142, 144, and 146, one or more networks discussed above, as well as nodes identified in FIGS. 3 and 5-11) may be implemented using all of the components, or any appropriate combination of the components, of computer system 1200 described below.

Computer system 1200 may have one or more input devices 1202 (which may include a keypad, keyboard, mouse, stylus, etc.), one or more output devices 1204 (which may include one or more displays, one or more speakers, one or more printers, etc.), one or more storage devices 1206, and one or more storage medium 1208. An input device 1202 may be external or internal to computer system 1200. An output device 1204 may be external or internal to computer system 1200. A storage device 1206 may be external or internal to computer system 1200. A storage medium 1208 may be external or internal to computer system 1200.

System bus 1210 couples subsystems of computer system 1200 to each other. Herein, reference to a bus encompasses one or more digital signal lines serving a common function. The present disclosure contemplates any suitable system bus 1210 including any suitable bus structures (such as one or more memory buses, one or more peripheral buses, one or more local buses, or a combination of the foregoing) having any suitable bus architectures. Example bus architectures include, but are not limited to, Industry Standard Architecture (ISA) bus, Enhanced ISA (EISA) bus, Micro Channel Architecture (MCA) bus, Video Electronics Standards Association local (VLB) bus, Peripheral Component Interconnect (PCI) bus, PCI-Express bus (PCI-X), and Accelerated Graphics Port (AGP) bus.

Computer system 1200 includes one or more processors 1212 (or central processing units (CPUs)). A processor 1212 may contain a cache 1214 for temporary local storage of instructions, data, or computer addresses. Processors 1212 are coupled to one or more storage devices, including memory 1216. Memory 1216 may include random access memory (RAM) 1218 and read-only memory (ROM) 1220. Data and instructions may transfer bidirectionally between processors 1212 and RAM 1218. Data and instructions may transfer unidirectionally to processors 1212 from ROM 1220. RAM 1218 and ROM 1220 may include any suitable computer-readable storage media. For example, aspects of this paragraph may be used to implement stored information discussed in FIGS. 1-11 (e.g., in packet 200).

Computer system 1200 includes fixed storage 1222 coupled bi-directionally to processors 1212. Fixed storage 1222 may be coupled to processors 1212 via storage control unit 1207. Fixed storage 1222 may provide additional data storage capacity and may include any suitable computer-readable storage media. Fixed storage 1222 may store an operating system (OS) 1224, one or more executables (EXECs) 1226, one or more applications or programs 1228, data 1230 and the like. Fixed storage 1222 is typically a secondary storage medium (such as a hard disk) that is slower than primary storage. In appropriate cases, the information stored by fixed storage 1222 may be incorporated as virtual memory into memory 1216. For example, aspects of this paragraph may be used to implement stored information discussed in FIGS. 1-11 (e.g., in packet 200).

Processors 1212 may be coupled to a variety of interfaces, such as, for example, graphics control 1232, video interface 1234, input interface 1236, output interface 1237, and storage interface 1238, which in turn may be respectively coupled to appropriate devices. Example input or output devices include, but are not limited to, video displays, track balls, mice, keyboards, microphones, touch-sensitive displays, transducer card readers, magnetic or paper tape readers, tablets, styli, voice or handwriting recognizers, biometrics readers, or computer systems. Network interface 1240 may couple processors 1212 to another computer system or to network 1242. Network interface 1240 may include wired, wireless, or any combination of wired and wireless components. Such components may include wired network cards, wireless network cards, radios, antennas, cables, or any other appropriate components. With network interface 1240, processors 1212 may receive or send information from or to network 1242 in the course of performing steps of particular embodiments. Particular embodiments may execute solely on processors 1212. Particular embodiments may execute on processors 1212 and on one or more remote processors operating together.

In a network environment, where computer system 1200 is connected to network 1242, computer system 1200 may communicate with other devices connected to network 1242. Computer system 1200 may communicate with network 1242 via network interface 1240. For example, computer system 1200 may receive information (such as a request or a response from another device) from network 1242 in the form of one or more incoming packets at network interface 1240 and memory 1216 may store the incoming packets for subsequent processing. Computer system 1200 may send information (such as a request or a response to another device) to network 1242 in the form of one or more outgoing packets from network interface 1240, which memory 1216 may store prior to being sent. Processors 1212 may access an incoming or outgoing packet in memory 1216 to process it, according to particular needs.

Particular embodiments involve one or more computer-storage products that include one or more computer-readable storage media that embody software for performing one or more steps of one or more processes described or illustrated herein. In particular embodiments, one or more portions of the media, the software, or both may be designed and manufactured specifically to perform one or more steps of one or more processes described or illustrated herein. In addition or as an alternative, in particular embodiments, one or more portions of the media, the software, or both may be generally available without design or manufacture specific to processes described or illustrated herein. Example computer-readable storage media include, but are not limited to, CDs (such as CD-ROMs), FPGAs, floppy disks, optical disks, hard disks, holographic storage devices, ICs (such as ASICs), magnetic tape, caches, PLDs, RAM devices, ROM devices, semiconductor memory devices, and other suitable computer-readable storage media. In particular embodiments, software may be machine code which a compiler may generate or one or more files containing higher-level code which a computer may execute using an interpreter.

As an example and not by way of limitation, memory 1216 may include one or more computer-readable storage media embodying software and computer system 1200 may provide particular functionality described or illustrated herein as a result of processors 1212 executing the software. Memory 1216 may store and processors 1212 may execute the software. Memory 1216 may read the software from the computer-readable storage media in mass storage device 1216 embodying the software or from one or more other sources via network interface 1240. When executing the software, processors 1212 may perform one or more steps of one or more processes described or illustrated herein, which may include defining one or more data structures for storage in memory 1216 and modifying one or more of the data structures as directed by one or more portions the software, according to particular needs. In addition or as an alternative, computer system 1200 may provide particular functionality described or illustrated herein as a result of logic hardwired or otherwise embodied in a circuit, which may operate in place of or together with software to perform one or more steps of one or more processes described or illustrated herein. The present disclosure encompasses any suitable combination of hardware and software, according to particular needs.

Herein, reference to a computer-readable non-transitory storage medium may include a semiconductor-based or other integrated circuit (IC), such as for example a field-programmable gate array (FPGA) or an application-specific IC (ASIC), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, another suitable medium, or a suitable combination of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method executed by at least one processor comprising: receiving, at a first node, a first request sent from a first customer;
determining, by the first node, first information from the first request; using, by the first node, the first information to determine a second node;
sending, by the first node, a first message to the second node, the first message comprising second information from the first request;
receiving, by the first node and after sending the first message a workflow from the second node;
determining, by the first node, a first service provider and a second service provider using the workflow;
sending, by the first node, a second message to the first service provider, the second message comprising a request to create a first service;
sending, by the first node, a third message to the second service provider, the third message comprising a request to create a second service, the second service different than the first service;
receiving, by the first node, a fourth message from the first service provider, the fourth message comprising an indication that the first service was created;
receiving, by the first node, a fifth message from the second service provider, the fifth message comprising an indication that the second service was created;
sending, by the first node, a sixth message to the first service provider, the sixth message comprising a request to activate the first service;
receiving, by the first node, a seventh message from the first service provider, the seventh message comprising an indication that the first service was activated;
sending, by the first node, an eighth message to the second service provider upon receiving the seventh message, the eighth message comprising a request to activate the second service;
and sending, by the first node, a sixth ninth message to the first customer, the sixth ninth message comprising information regarding the first service and information regarding the second service.

2. The method of claim 1, wherein the ninth message comprises a network address of a virtual machine.

3. The method of claim 1, further comprising:
sending a multicast advertisement in a first protocol;
receiving a unicast service registration in the first protocol sent by the first service provider in response to receiving the advertisement;
receiving a multicast discovery request in the first protocol from a second service provider; and
sending a unicast advertisement in the first protocol to the second service provider in response to receiving the multicast discovery request.

4. The method of claim 1, wherein the ninth message comprises a dotted decimal name associated with the first service.

5. The method of claim 1, wherein the first message comprises identification information associated with the first customer.

6. The method of claim 1, wherein the workflow comprises:
a first portion formatted according to first protocol; and
a second portion formatted in an extensible markup language (XML) format.

7. The method of claim 6, wherein:
the first portion is in a plain text format.

8. A non-transitory computer-readable medium comprising instructions, that, when executed by at least one processor, are configured to: receive, at a first node, a first request sent from a first customer;
determine, by the first node, first information from the first request; use, by the first node, the first information to determine a second node;
send, by the first node, a first message to the second node, the first message comprising second information from the first request;
receive, by the first node and after sending the first message, a workflow from the second node; determine, by the first node, a first service provider and a second service provider using the workflow;
send, by the first node, a second message to the first service provider, the second message comprising a request to create a first service;
send, by the first node, a third message to the second service provider, the third message comprising a request to create a second service, the second service different than the first service;
receive, by the first node, a fourth message from the first service provider, the fourth message comprising an indication that the first service was created;
receive, by the first node, a fifth message from the second service provider, the fifth message comprising an indication that the second service was created;
send, by the first node, a sixth message to the first service provider, the sixth message comprising a request to activate the first service;
receive, by the first node, a seventh message from the first service provider, the seventh message comprising an indication that the first service was activated;
send, by the first node, an eighth message to the second service provider upon receiving the seventh message, the eighth message comprising a request to activate the second service;
and send, by the first node, a sixth ninth message to the first customer, the sixth ninth message comprising information regarding the first service and information regarding the second service.

9. The medium of claim 8, wherein the sixth ninth message comprises a network address of a virtual machine.

10. The medium of claim 8, wherein the instructions are further configured to:
send a multicast advertisement in a first protocol;
receive a unicast service registration in the first protocol sent by the first service provider in response to receiving the advertisement;
receive a multicast discovery request in the first protocol from a second service provider; and
send a unicast advertisement in the first protocol to the second service provider in response to receiving the multicast discovery request.

11. The medium of claim 8, wherein the sixth ninth message comprises a dotted decimal name associated with the first service.

12. The medium of claim 8, wherein the first message comprises identification information associated with the first customer.

13. The medium of claim 8, wherein the workflow comprises:
a first portion formatted according to first protocol; and
a second portion formatted in an extensible markup language (XML) format.

14. The medium of claim 13, wherein:
the first portion is in a plain text format.

15. A system comprising: an interface configured to receive, at a first node, a first request sent from a first customer for a first service provided by a first service provider; and at least one processor configured to:
- determine, by the first node, first information from the first request; and use, by the first node, the first information to determine a second node;
- wherein the interface is further configured to send, by the first node, a first message to the second node, the first message comprising second information from the first request;
- wherein the interface is further configured to receive, by the first node and after sending the first message, a workflow from the second node;
- wherein the at least one processor is further configured to determine, by the first node, a first service provider and a second service provider using the workflow;
- wherein the interface is further configured to: send, by the first node, a second message to the first service provider, the second message comprising a request to create a first service;
- send, by the first node, a third message to the second service provider, the third message comprising a request to create a second service, the second service different than the first service;
- receive, by the first node, a fourth message from the first service provider, the fourth message comprising an indication that the first service was created;
- receive, by the first node, a fifth message from the second service provider, the fifth message comprising an indication that the second service was created;
- send, by the first node, a sixth message to the first service provider, the sixth message comprising a request to activate the first service;
- receive, by the first node, a seventh message from the first service provider, the seventh message comprising an indication that the first service was activated;
- send, by the first node, an eighth message to the second service provider upon receiving the seventh message, the eighth message comprising a request to activate the second service;
- and send, by the first node, a sixth ninth message to the first customer, the si4h ninth message comprising information regarding the first service and information regarding the second service.

16. The system of claim 15, wherein the sixth ninth message comprises a network address of a virtual machine.

17. The system of claim 15, wherein the interface is further configured to:
- send a multicast advertisement in a first protocol;
- receive a unicast service registration in the first protocol sent by the first service provider in response to receiving the advertisement;
- receive a multicast discovery request in the first protocol from a second service provider; and
- send a unicast advertisement in the first protocol to the second service provider in response to receiving the multicast discovery request.

18. The system of claim 15, wherein the sixth ninth message comprises a dotted decimal name associated with the first service.

19. The system of claim 15, wherein the first message comprises identification information associated with the first customer.

20. The system of claim 15, wherein the workflow comprises:
- a first portion formatted according to first protocol; and
- a second portion formatted in an extensible markup language (XML) format.

21. The system of claim 20, wherein:
the first portion is in a plain text format.

* * * * *